US009908463B2

United States Patent
Shibata et al.

(10) Patent No.: US 9,908,463 B2
(45) Date of Patent: Mar. 6, 2018

(54) LIGHT EMITTING INTERIOR PRODUCT

(71) Applicant: TOYODA GOSEI CO., LTD., Kiyosu-shi, Aichi-ken (JP)

(72) Inventors: Minoru Shibata, Kiyosu (JP); Shinichiro Fuki, Kiyosu (JP); Jiyun Paku, Kiyosu (JP); Satomi Akehi, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 93 days.

(21) Appl. No.: 14/966,070

(22) Filed: Dec. 11, 2015

(65) Prior Publication Data

US 2016/0185289 A1    Jun. 30, 2016

(30) Foreign Application Priority Data

Dec. 25, 2014   (JP) .................................. 2014-261795
Oct. 23, 2015   (JP) .................................. 2015-208828

(51) Int. Cl.
| | |
|---|---|
| *F21V 33/00* | (2006.01) |
| *B60Q 3/225* | (2017.01) |
| *B60H 1/34* | (2006.01) |
| *B60Q 3/20* | (2017.01) |
| *B60Q 3/275* | (2017.01) |
| *B60Q 3/80* | (2017.01) |

(52) U.S. Cl.
CPC ............... *B60Q 3/225* (2017.02); *B60H 1/34* (2013.01); *B60Q 3/20* (2017.02); *B60Q 3/275* (2017.02); *B60Q 3/80* (2017.02)

(58) Field of Classification Search
CPC ...................................................... F21V 33/00
USPC ........................................... 362/96, 154–155
See application file for complete search history.

(56) References Cited

U.S. PATENT DOCUMENTS

| | | | |
|---|---|---|---|
| 8,707,612 B2 * | 4/2014 | Konz ..................... | A01K 97/04 362/154 |
| 2003/0081411 A1 * | 5/2003 | Noda ..................... | B60Q 3/275 362/155 |
| 2006/0028820 A1 * | 2/2006 | Fitzsimmons ......... | A01K 97/06 362/276 |
| 2008/0170388 A1 * | 7/2008 | Greil ...................... | F25D 27/00 362/155 |
| 2009/0296401 A1 * | 12/2009 | Gutierrez, Jr. .......... | F21V 14/04 362/284 |

(Continued)

FOREIGN PATENT DOCUMENTS

JP         2001-287540 A    10/2001

*Primary Examiner* — Edwyn Labaze
(74) *Attorney, Agent, or Firm* — Posz Law Group, PLC

(57) ABSTRACT

A storage device includes a storage body having an opening and a lid for selectively opening and closing the opening of the storage body. The storage body has a light emitter and a power receiving portion connected to the light emitter. The lid has a power supplying portion, which is configured to supply power to the power receiving portion by the direct current resonance method. The light emitter emits light to interior of the storage body at a first luminance when the opening is closed by the lid. When the lid opens the opening so that the distance between the power receiving portion and the power supplying portion is reduced, the light emitter changes the luminance to a second luminance, which is different from the first luminance.

11 Claims, 17 Drawing Sheets

(56) References Cited

U.S. PATENT DOCUMENTS

2012/0102894 A1* 5/2012 TerHaar ................ B65D 43/16
53/492

* cited by examiner

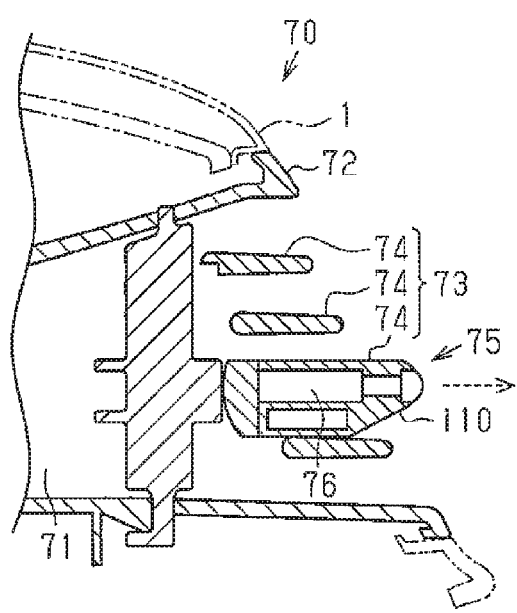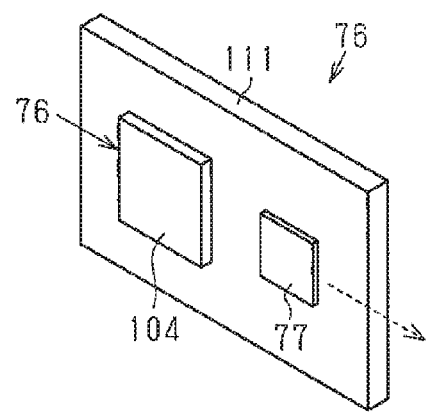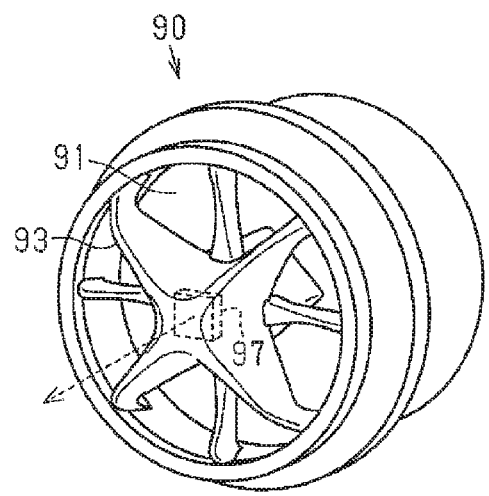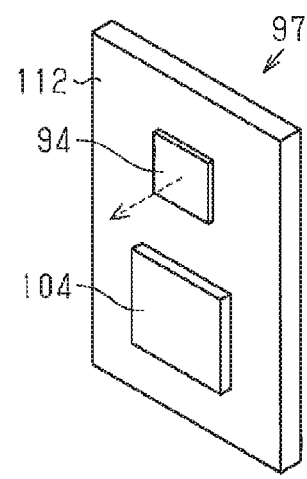

LIGHT EMITTING INTERIOR PRODUCT

BACKGROUND OF THE INVENTION

The present invention relates to a light emitting interior product in which a light emitting portion is supplied with power in a contactless manner.

Interior products arranged in the instrument panel in a passenger compartment have a number of light emitting portions. For example, Japanese Laid-Open Patent Publication No. 2001-287540 discloses a technique of wireless power supply for a light emitting portion provided in an outlet grille of a vehicle air conditioner.

A type of interior product has been known that includes a fixed body, which is fixed to the instrument panel, and a movable body, which is movable in relation to the fixed body. Such interior products include the glove compartment. The fixed body in a glove compartment is a storage body, which is fixed to the instrument panel, and the movable body in a glove compartment is a lid body, which is movable relative to the storage body. When using a light emitting portion in an interior product constructed by the combination of a fixed body and a movable body, wireless power supply is useful to avoid troublesome routing of feeder lines and signal lines without breaking these lines.

In recent years, interior products constructed with fixed bodies and movable bodies have been desired to create various types of atmosphere such as relaxed ambience, elevated luxury, and elevated aesthetic appearance. To improve design features such as aesthetic appearance by omitting feeder lines and signal lines, the power supply efficiency in wireless power supply is desired to be improved. In illumination with light emitting portions, ambient lighting is desired in addition to simple direct lighting or functional lighting.

The demands for improved power supply efficiency and addition of ambient lighting are not limited in the field of interior products mounted in vehicles, but also exist in fields of interior products for buildings and aircrafts.

SUMMARY OF THE INVENTION

Accordingly, it is an objective of the present invention to provide a light emitting interior product configured to improve the power supply efficiency and increase the effect of ambient lighting in accordance with movement of a member.

To achieve the foregoing objective and in accordance with one aspect of the present invention, a light emitting interior product is provided that includes a first component, a second component, a light emitting portion provided in the first component, a power receiving portion, which is provided in the first component and connected to the light emitting portion, and a power supplying portion, which is provided in the second component and configured to supply power to the power receiving portion by a direct current resonance method. One of the first component and the second component is a fixed body, which is held in a stopped state. The other one of the first component and the second component is a movable body, which is moved relative to the fixed body. The power supplying portion and the power receiving portion are arranged such that, when the movable body is moved relative to the fixed body, one of a distance and an angle between the power supplying portion and the power receiving portion changes, and the light emitting portion changes a manner of light emission in accordance with the change.

The above configuration improves the power supply efficiency between the power supplying portion and the power receiving portion by moving one of the first component and the second component and supplying power from the power supplying portion to the power receiving portion by the direct current resonance method. Relative movement between the first component and the second component changes the distance between or the angle defined by the power supplying portion and the power receiving portion, so that the manner in which the light is emitted is changed in accordance with the change in the distance or the angle. Accordingly, the effect of the ambient lighting is increased in accordance with movement of the components.

BRIEF DESCRIPTION OF THE DRAWINGS

FIG. 21A is a cross-sectional view of a register unit according to a ninth embodiment, illustrating the register unit shown in FIG. 17;

FIG. 21B is a perspective view showing a circuit board incorporated in a manipulation portion for regulating the air flow direction of the register unit of FIG. 21A;

FIG. 22A is a perspective view of a register unit according to a tenth embodiment, illustrating a part of the register unit shown in FIG. 18;

FIG. 22B is a perspective view showing a circuit board incorporated in the register unit of FIG. 22A;

DETAILED DESCRIPTION OF THE PREFERRED EMBODIMENTS

Light emitting interior products according to first to thirteenth embodiments will now be described with reference to FIGS. 1 to 34.

Figure 1:
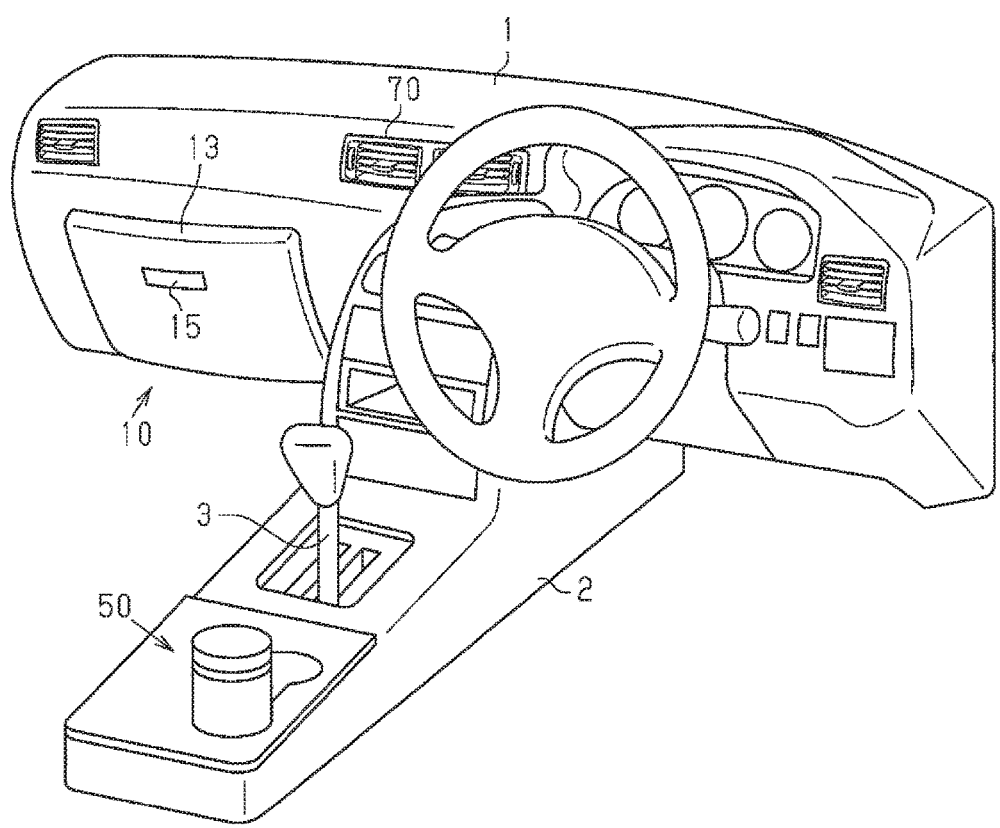
FIG. 1 is a perspective view illustrating the instrument panel and the center console of a vehicle in which light emitting interior products for a vehicle are installed.

As shown in FIG. 1, the light emitting interior products described herein are used in a vehicle. The light emitting interior products include a storage device 10, which corresponds to a glove compartment, a holder device 50 for holding a cylindrical object, and a register unit 70 for the air conditioner. The storage device 10 is provided in an instrument panel 1, which is located below the windshield and extends between the right side and the left side of the passenger compartment. The holder device 50 is provided in a center console 2, which separates the driver's seat and the front passenger seat. The register unit 70 is provided in the instrument panel 1 or the center console 2.

First Embodiment

Figure 2:
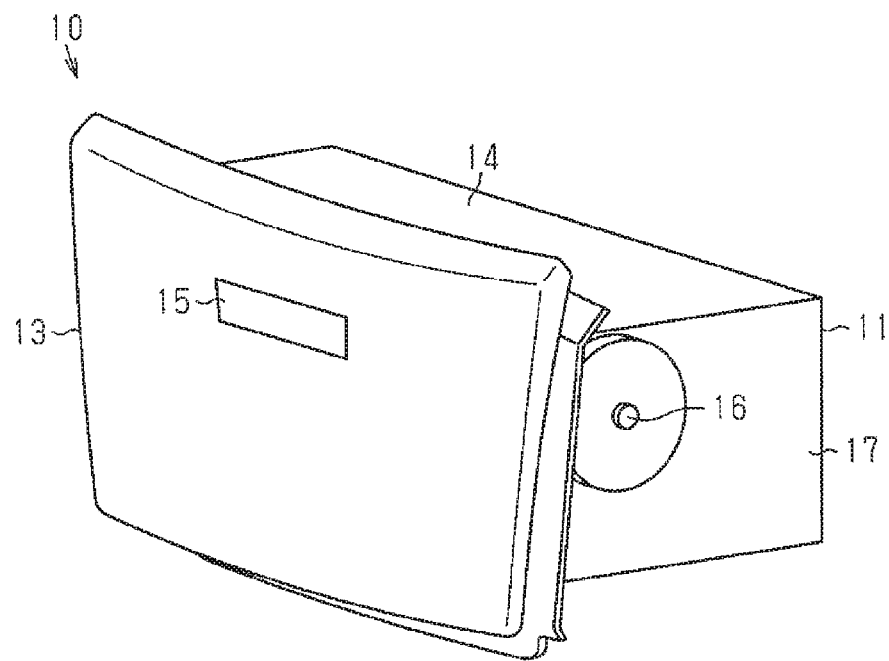
FIG. 2 is a perspective view of a storage device according to a first embodiment, illustrating a state in which a lid closes a storage portion.
Figure 3:
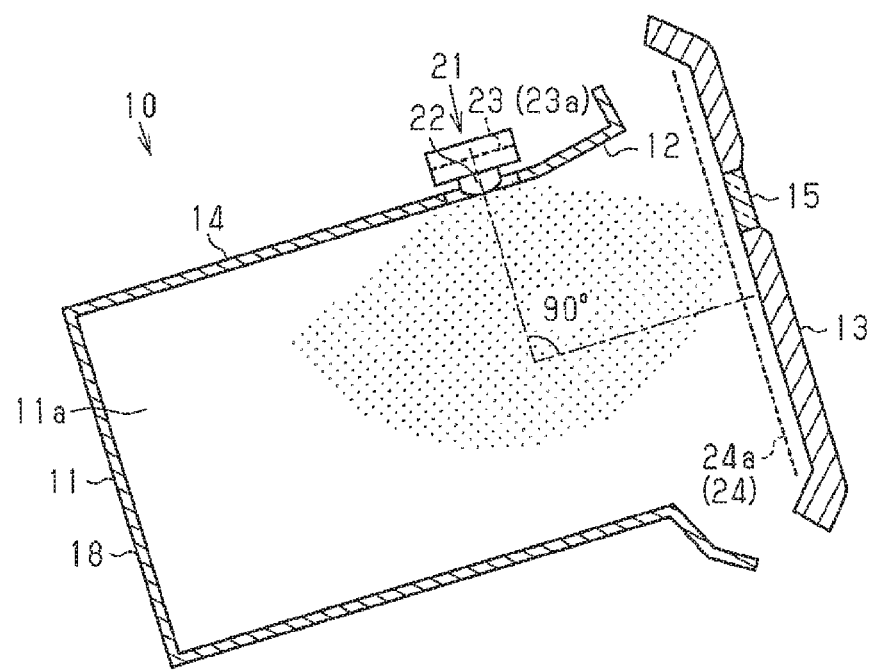
FIG. 3 is a cross-sectional view of the storage device of FIG. 1, illustrating a state in which the storage portion is closed by the lid.

First, the storage device 10, which corresponds to the light emitting interior product according to the first embodiment, will be described with reference to FIGS. 2 to 5. The storage device 10 corresponds to the glove compartment. As shown in FIGS. 2 and 3, the storage device 10 includes a storage body 11 (a first storage body), which is located at a part in the instrument panel 1 that faces the front passenger seat, and a lid 13, which opens and closes an opening 12 of the storage body 11. The storage body 11 is a fixed body, which is fixed to the instrument panel 1, and the lid 13 is a movable body, which pivots relative to the storage body 11.

The storage body 11 incorporates a storage portion 11a, which stores small articles. The opening 12 is formed to be continuous with the storage portion 11a at an end of the storage body 11 that faces the front passenger seat. The lid 13 is a plate-like member having a shape and a size substantially the same as those of the opening 12. The surface of the lid 13 that faces the front passenger seat constitutes a decorated surface. The lid 13 is pivotally supported by side surfaces 17 of the storage body 11 with pivotal supporting members 16. The lid 13 has an optically transparent window 15, so that the interior of the storage portion 11a can be seen when the opening 12 is closed by the lid 13. When the opening 12 is closed by the lid 13, the lid 13 is substantially perpendicular to a top plate 14 of the storage body 11. When opening the opening 12, the lid 13 is pivoted substantially 90 degrees to be substantially parallel with the top plate 14 at a position above the top plate 14.

Figure 5:
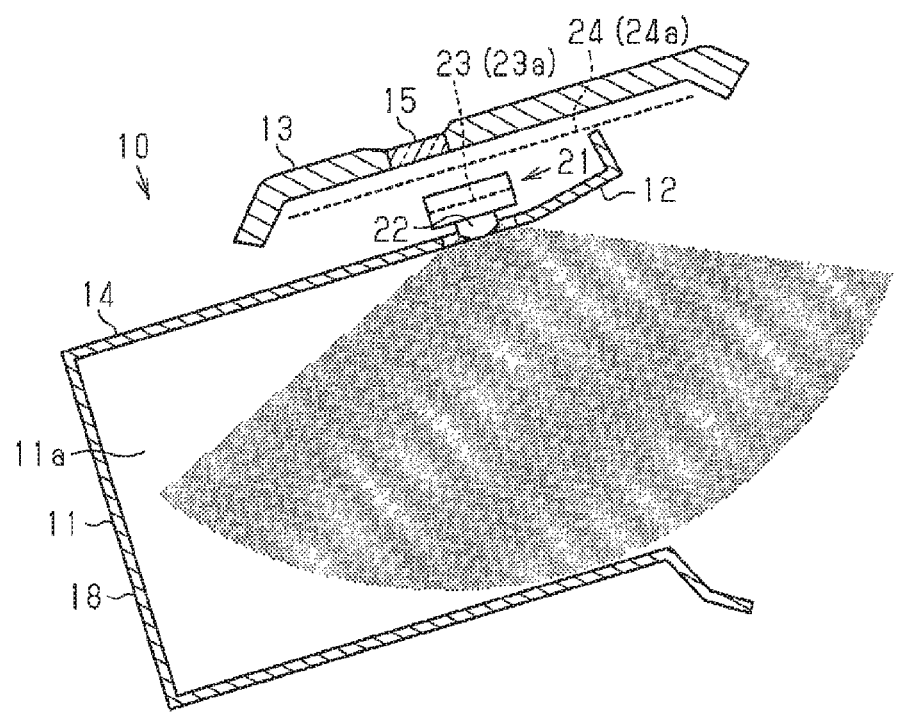
FIG. 5 is a cross-sectional view of the storage device of FIG. 1, illustrating a state in which the lid opens the storage portion.

As shown in FIGS. 3 and 5, a light emitting unit 21 is provided on the top plate 14 of the storage body 11 to emit light to the storage portion 11a. The light emitting unit 21 includes a light emitter 22, which is a light emitting portion such as an LED or an EL device, and a power receiving portion 23 for wireless power supply. Thus, the storage body 11 (the first storage body) corresponds to a first component. The light emitting unit 21 is constituted by arranging a circuit board on which the light emitter 22 is mounted in a housing. The circuit board has a loop coil 23a, which constitutes a part of the power receiving portion 23. The loop coil 23a is represented by a broken line and constitutes a part of a first resonance circuit on the power receiving side. The loop coil 23a is located on a surface parallel with the top plate 14. The light emitter 22 emits light to the storage portion 11a from the top plate 14 of the storage body 11.

The lid 13 has a power supplying portion 24, which performs wireless power supply to the light emitting unit 21.

Thus, the lid 13 corresponds to a second component. The power supplying portion 24 includes a loop coil 24a, which is located on the back surface of the lid 13, which faces the storage portion 11a. The loop coil 24a is represented by a broken line and constitutes a part of a second resonance circuit on the power supplying side. The loop coil 24a is formed along the outer periphery of the lid 13 to maximize the open area of the loop coil 24a.

Figure 6:
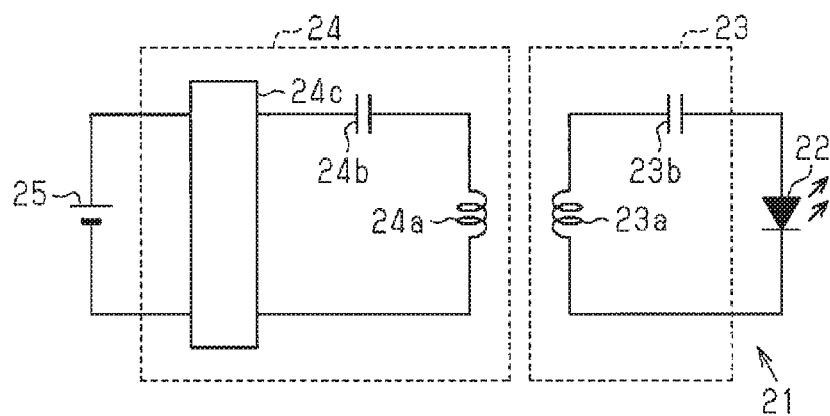
FIG. 6 is a circuit diagram of a wireless power supply system of a direct current resonance method.

A direct current resonance method is employed for the wireless power supply system. In the direct current resonance method, a direct-current voltage generates an electromagnetic resonance field, which changes with time at a resonant frequency. Power is supplied across the space from the power supplying side to the power receiving side by causing the second resonance circuit on the power supplying side and the first resonance circuit on the power receiving side to resonate with each other. Specifically, as shown in FIG. 6, the power supplying portion 24 includes the second resonance circuit and a switching circuit 24c, which performs high-speed switching operation. The second resonance circuit is constituted by connecting, in series, the supplying-side loop coil 24a and a capacitor 24b with a vehicle battery 25, which is a direct-current power source. The supplying-side loop coil 24a is a one-turn coil having a simplified structure in the present embodiment. The supplying-side loop coil 24a is formed by a wiring pattern on the circuit board. The capacitor 24b and the switching circuit 24c are mounted on the same circuit board as the loop coil 24a or on another circuit board. In response to the high-speed switching, the switching circuit 24c performs zero voltage switching (ZVS) to reduce power loss such as switching loss and suppress electromagnetic noise. The power receiving portion 23 includes the first resonance circuit, which is constituted by connecting, in series, the receiving-side loop coil 23a and a capacitor 23b to the light emitter 22.

In the wireless power supply system of the direct current resonance method, a resonance field, which changes with time, is directly generated from a direct-current power source such as the vehicle battery 25. Power is supplied across the space from the power supplying side to the power receiving side by causing the second resonance circuit on the power supplying side and the first resonance circuit on the power receiving side to resonate with each other. In the direct current resonance method, energy conversion is directly performed from a direct-current power source. Thus, the energy conversion efficiency and the power supply efficiency are high.

Figure 7:
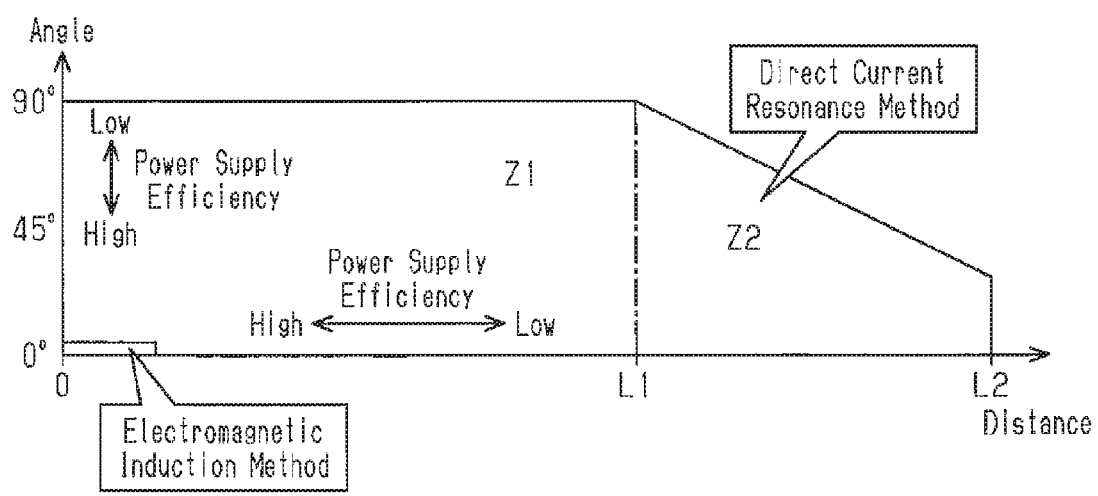
FIG. 7 is a diagram showing the relationship among a distance, an angle, and the power supply efficiency in the direct current resonance method.

FIG. 7 shows the relationship among the distance between the power supplying portion and the power receiving portion, the angle defined by the power supplying portion and the power receiving portion, and the region in which the light emitter 22 of the present embodiment can emit light. In this region, the power supply efficiency is decreased as the distance is increased and is decreased as the angle is increased.

As illustrated on the left side of FIG. 7, regarding the distance between the power supplying portion and the power receiving portion, the maximum value of the distance between the power supplying portion and the power receiving portion at which a light emitter can emit light is in a range from a few millimeters to approximately one centimeter by the electromagnetic induction method in conformity with the Qi standard. In contrast, as illustrated on the right side of FIG. 7, the maximum value of the distance between the power supplying portion 24 and the power receiving portion 23 at the light emitter 22 by the direct current resonance method can emit light is in a range from approximately 10 cm to 20 cm, which is longer than that by the electromagnetic induction method.

In the electromagnetic induction method in conformity with the Qi standard, the maximum angle defined by the power supplying portion and the power receiving portion at which the emitter can emit light is substantially 0 degrees, which is significantly small. In contrast, the maximum value of the angle defined by the power supplying portion 24 and the power receiving portion 23 at which the light emitter 22 can emit light by the direct current resonance method is approximately 90 degrees. Thus, compared to the electromagnetic induction method, the direct current resonance method is more flexible in the arrangement of the power supplying portion 24 and the power receiving portion 23.

In the regions in which the light emitter 22 can emit light, the influence of changes in the power supply efficiency on the luminance of the light emitter 22 is small in a first region Z1, in which the distance is less than or equal to L1.

In contrast, the influence of changes in the power supply efficiency on the luminance of the light emitter 22 is great in a second region Z2, in which the distance is greater than L1 and less than or equal to L2. In the region Z2, the luminance of the light emitter 22 is lowered as the power supply efficiency decreases due to increase in the distance. The second region Z2 corresponds to a gradual reduction region of the direct current resonance method. In the present embodiment, the luminance of the light emitter 22 is changed by changing the distance and the angle in the second region Z2 (the gradual reduction region).

Figure 4:
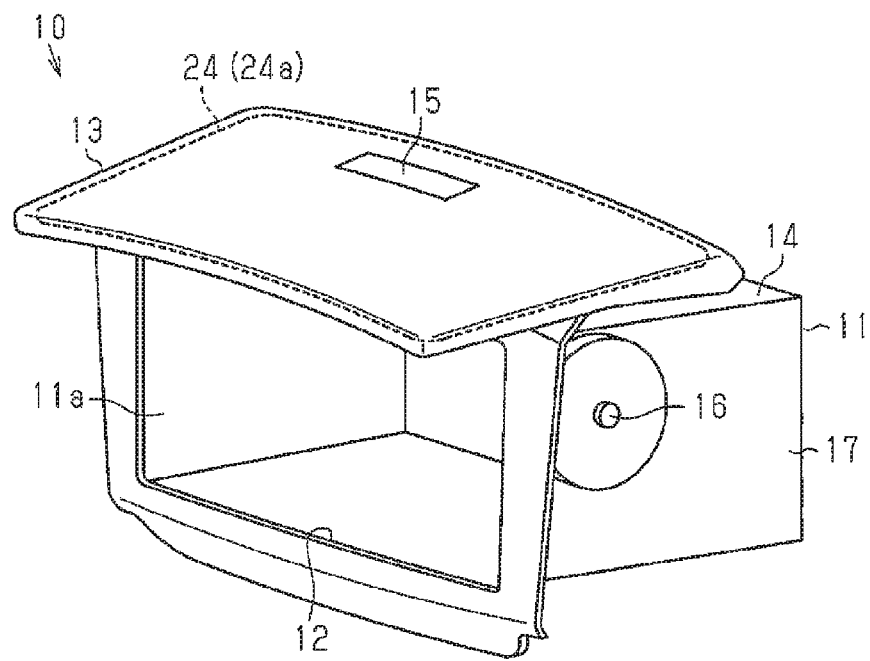
FIG. 4 is a perspective view of the storage device of FIG. 1, illustrating a state in which the lid opens the storage portion.

As shown in FIGS. 2 and 3, when the opening 12 of the storage device 10 is closed by the lid 13, the angle defined by the central axis of the supplying-side loop coil 24a and the central axis of the receiving-side loop coil 23a, that is, the angle defined by the power supplying portion 24 and the power receiving portion 23 is set to be substantially 90 degrees. Further, when the opening 12 is closed by the lid 13, the distance between the supplying-side loop coil 24a and the receiving-side loop coil 23a is greater than that in a state in which the opening 12 is opened by the lid 13 as shown in FIGS. 4 and 5. Thus, the power supply efficiency between the power receiving portion 23 and the power supplying portion 24 is relatively low when the opening 12 is closed by the lid 13, and the light emitter 22 emits light at a first luminance, which is lower than that when the storage portion 11a is open. This state is achieved by using a distance that is greater than the median value in the range of the distances that correspond to the second region Z2 (gradual reduction region) in FIG. 7. In this state, the user can visually check the articles in the storage portion 11a through the window 15 of the lid 13 even in the dark. At this time, the light emitted by the light emitter 22 in the storage body 11 leaks out of the storage device 10 through the window 15, thus functioning as ambient lighting in the passenger compartment.

When opening the opening 12 of the storage body 11 as shown in FIGS. 4 and 5, the lid 13 is pivoted substantially 90 degrees about the pivotal supporting members 16 and arranged substantially parallel with the top plate 14 at a position above the top plate 14. Accordingly, the supplying-side loop coil 24a and the receiving-side loop coil 23a are brought closer to each other and the distance in between is reduced. Further, the central axis of the supplying-side loop coil 24a and the central axis of the receiving-side loop coil 23a are parallel with each other and the angle between the axes is substantially 0 degrees. This increases the power supply efficiency between the power receiving portion 23 and the power supplying portion 24, and the light emitter 22 in the top plate 14 of the storage body 11 emits light into the storage portion 11a at a second luminance, which is higher than the first luminance at the time of closure of the opening 12 by the lid 13. Thus, the storage portion 11a is brighter when the lid 13 is at a position for opening the opening 12 than when the lid 13 is at a position for closing the opening 12. This allows the user to reliably check the articles in the storage portion 11a. This state is achieved by using the first region Z1 in FIG. 7.

The lid 13 is pivotally supported by the pivotal supporting members 16. Thus, when the lid 13 opens the opening 12, the distance between the power receiving portion 23 and the power supplying portion 24 gradually decreases, and the angle in between gradually decreases, accordingly. This gradually increases the power supply efficiency. Thus, the luminance of the light emitter 22 is gradually increased from the first luminance to the second luminance as the lid 13 opens the opening 12. When the lid 13 closes the opening 12, the distance between the power receiving portion 23 and the power supplying portion 24 gradually increases, and the angle in between gradually increases, accordingly. This gradually decreases the power supply efficiency. Thus, the luminance of the light emitter 22 is gradually decreased from the second luminance to the first luminance as the lid 13 closes the opening 12. This state is achieved by moving the power supplying portion 24 within the second region Z2 in FIG. 7 (the gradual reduction region). As described above, the luminance of the light emitter 22 in the storage device 10 is changed in conjunction with opening/closing operation of the lid 13. This allows the light emitter 22 to function as ambient lighting.

The storage device 10 of the above described first embodiment achieves the following advantages.

(1) When the lid 13 opens the opening 12 of the storage portion 11a of the storage body 11 (the first storage body), the storage device 10 becomes gradually brighter in accordance with the pivoted amount of the lid 13 in the opening direction. When the lid 13 closes the opening 12, the storage device 10 becomes gradually darker in accordance with the pivoted amount of the lid 13 in the closing direction. In this manner, the luminance of the light emitter 22 of the storage device 10 is changed in conjunction with opening/closing operation of the lid 13. This allows the light emitter 22 to function as ambient lighting.

(2) In the storage device 10, the power receiving portion 23 in the storage body 11 is supplied with power from the power supplying portion 24 in the lid 13 through wireless power supply. This eliminates the necessity for wired connection between the power source and the light emitter 22. Thus, unlike the case of wired connection, problems such as breakage of wires do not occur.

(3) The direct current resonance method is used in the wireless power supply system. Thus, the power supply efficiency is higher than the electromagnetic induction method in conformity with the Qi standard. The direct current resonance method is capable of allowing the light emitter 22 to emit light in wider ranges of the distance between the power supplying portion 24 and the power receiving portion 23 and the angle between the power supplying portion 24 and the power receiving portion 23 than the electromagnetic induction method. Thus, the arrangement of the supplying-side loop coil 24a and the receiving-side loop coil 23a can be highly flexibly determined. The positions of the supplying-side loop coil 24a and the receiving-side loop coil 23a can be determined in accordance with the manner in which the luminance is changed.

(4) When the passenger compartment is dark, for example, during the night and the opening 12 is closed by the lid 13, the light emitter 22 is turned on at the first luminance in conjunction with the headlights being turned on. This allows the user to visually check the state of storage portion 11a through the window 15. The light emitted at the first luminance by the light emitter 22 leaks out of the storage device 10 through the window 15 and functions as ambient lighting in the passenger compartment. Further, since the light emitter 22 becomes brighter when the lid 13 opens the opening 12, the user can visually check the articles inside. This allows the user to easily take out the articles.

The storage device 10 of the first embodiment may be modified as follows.

The lid 13 does not need to be pivoted in a direction for being parallel with the top plate 14. That is, the lid 13 may be pivoted in a direction for being parallel with the side surfaces 17. In this case, the receiving-side loop coil 23a, which constitutes a part of the power receiving portion 23, is arranged at a position in the vicinity of the supplying-side loop coil 24a, which is provided in the lid 13.

In the direction from the opening 12 toward a back wall 18 of the storage body 11, the light emitting unit 21 does not need to be located at a position closer to the opening 12 than the center of the top plate 14, but may be located at a position closer to the back wall 18 than the center of the top plate 14.

The receiving-side loop coil 23a and the light emitter 22 do not need to be incorporated in a single unit. The receiving-side loop coil 23a and the light emitter 22 may be incorporated in different units, and the units may be arranged at positions that are spaced apart from each other. That is, the position of the receiving-side loop coil 23a is limited within a range in which power can be supplied by the supplying-side loop coil 24a. In contrast, the light emitter 22 can be located at any position in the storage body 11 if the wires from the first resonance circuit on the power receiving side are extended.

The size of the supplying-side loop coil 24a, which constitutes a part of the power supplying portion 24, may be changed such that the opening of the loop coil 24a is smaller than that of the outer circumference of the lid 13. The number of turns of the loop coil 24a is not limited to one.

The light emitter 22 may be turned off completely when the lid 13 closes the opening 12. In this case, the optically transparent window 15 may be omitted. In this case, when the opening 12 is closed by the lid 13, the receiving-side loop coil 23a only needs to be located outside the range in which power can be supplied by the supplying-side loop coil 24a.

As described above, the light emitter 22 may be turned on in conjunction with the headlights being turned on. That is, when the headlights are tuned on, the vehicle battery 25 supplies power to the power supplying portion 24. The light emitter 22 does not need to be turned in conjunction with the headlights being turned on.

The second resonance circuit on the power supplying side and the first resonance circuit on the power receiving side are not limited to the ones of the example shown in FIG. 6. For example, a capacitor may be provided in parallel with the loop coil 23a, and the capacitor may function as a power storing portion. A capacitor may be provided in parallel with the loop coil 24a, and the capacitor may function as a power storing portion.

Second Embodiment

A light emitting interior product according to the second embodiment will now be described with reference to FIGS. 8 to 11. A storage device 30 according to the second embodiment is a modification of the storage device 10 and includes a housing portion 31 in a part of the instrument panel 1 in front of the front passenger seat and a storage body 32 (a second storage body), which can be moved relative to the housing portion 31. The housing portion 31 is a fixed body that is constituted by a recess provided in the instrument panel 1. The storage body 32 is a movable body, which moves relative to the housing portion 31 and can be retracted into and extracted from the housing portion 31. The storage body 32 incorporates a storage portion 32a, which stores small articles. The storage body 32 has a first opening 33, which opens upward and is formed continuous with the storage portion 32a. A front surface 34a of the storage body 32 that faces the front passenger seat constitutes a decorated surface. The front surface 34a has an optically transparent window 38, so that the interior of the storage portion 32a can be visually checked when the storage body 32 is housed in the housing portion 31.

The storage body 32 has two side portions 34b, which face each other. Each side wall 34 is constituted by a surface perpendicular to the front surface 34a. The housing portion 31 has two side portions 31a, which face each other. The side portions 31a are each constituted by a surface parallel with the side portion 34b of the storage body 32. Each side portion 34b of the storage body 32 has guide projections 36. Each side portion 31a of the housing portion 31 has guide grooves 37. The guide projections 36 of the storage body 32 and the guide grooves 37 of the housing portion 31 form guide mechanisms 35, which guide movement of the storage body 32 relative to the housing portion 31. The guide grooves 37 are formed by elongated holes that are slightly curved in accordance with the movement range of the storage body 32. The guide projections 36 of the storage body 32 are each engaged with and moved within the corresponding guide groove 37. Accordingly, the storage body 32 is moved between a housed position, where the storage body 32 is housed in the housing portion 31 (see FIGS. 8 and 9), and an open position, where the first opening 33 is exposed to the outside (see FIGS. 10 and 11).

The storage body 32 further includes a back surface 34c, which faces the front surface 34a. A light emitting unit 21 is provided on the back surface 34c of the storage body 32 at a position in the vicinity of the first opening 33. The light emitting unit 21 emits light to the storage portion 32a. The light emitting unit 21 has the same structure as the light emitting unit 21 used in the storage device 10 of the first embodiment and includes a light emitter 22 and a power receiving portion 23 for wireless power supply. Thus, the storage body 32 (the second storage body) corresponds to a first component. A loop coil 23a in the power receiving portion 23 constitutes a part of a first resonance circuit on the power receiving side and is located on a surface that is substantially parallel with the back surface 34c. The light emitter 22 emits light to the storage portion 32a from the back surface 34c of the storage body 32.

The housing portion 31 has a power supplying portion 24, which performs wireless power supply to the light emitting unit 21. Thus, the housing portion 31 corresponds to a second component. The housing portion 31 has a second opening 39, and the storage body 32 is retracted into and extracted from the housing portion 31 through the second opening 39. The housing portion 31 has a loop coil 24a, which is located about the second opening 39. The loop coil 24a constitutes a part of a second resonance circuit on the power supplying side. The supplying-side loop coil 24a is formed along the outer periphery of the second opening 39 to maximize the open area of the loop coil 24a. The power supplying portion 24 uses, as a power source, the vehicle battery 25, which is a direct-current power source, and supplies the power to the power receiving portion 23 by the direct current resonance method. Since the direct current resonance method functions in the same manner as the storage device 10 of the first embodiment, detailed description thereof is omitted in the second embodiment.

Figure 8:
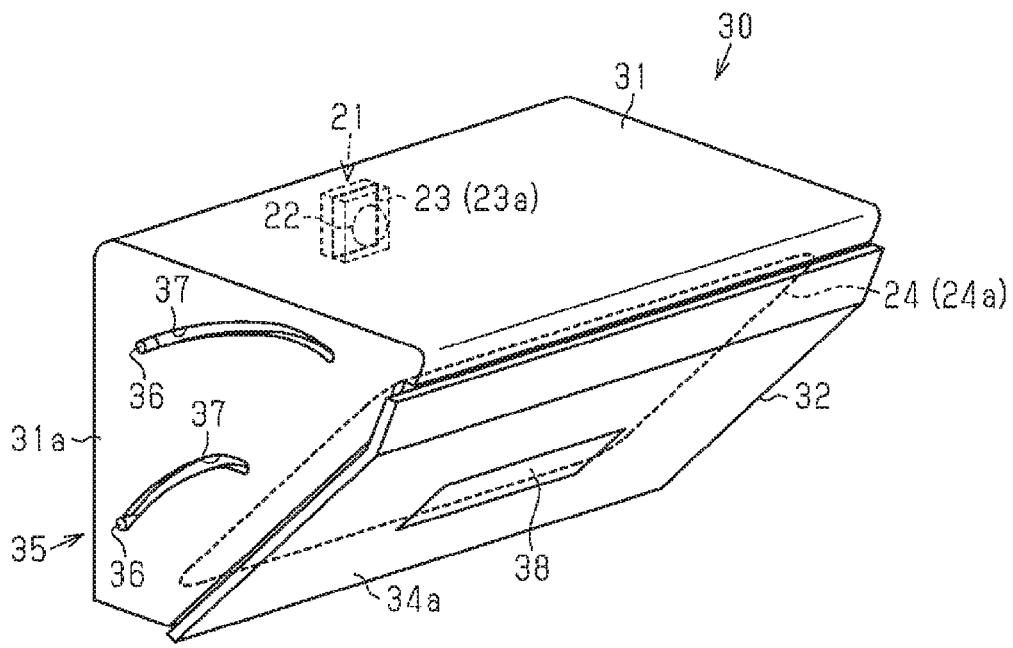
FIG. 8 is a perspective view of a storage device according to a second embodiment, illustrating a state in which a storage body is housed in a housing portion.
Figure 9:
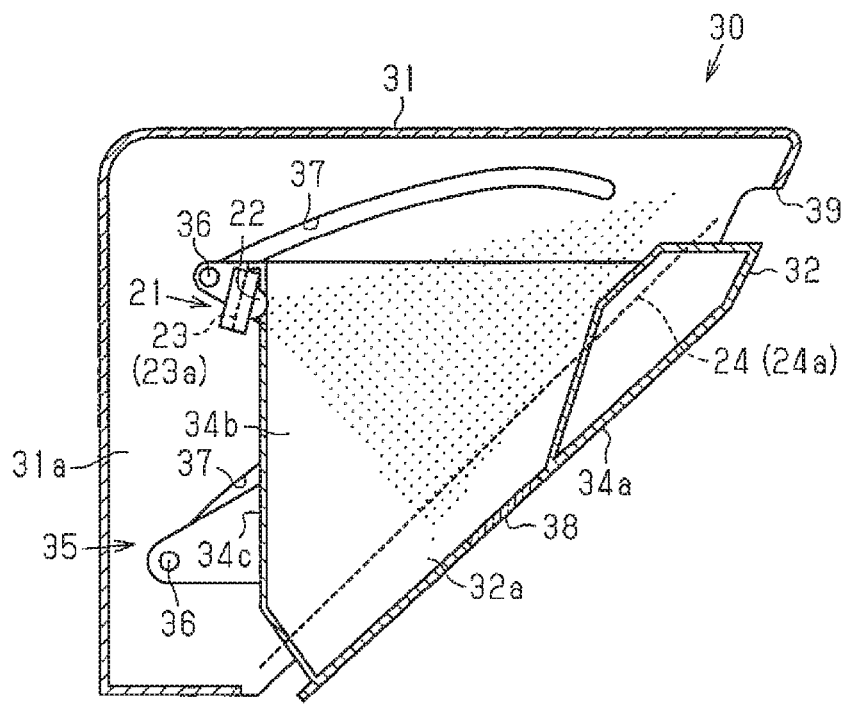
FIG. 9 is a cross-sectional view of the storage device of FIG. 8, illustrating a state in which the storage body is housed in the housing portion.

As shown in FIGS. 8 and 9, when the storage body 32 of the storage device 30 is housed in the housing portion 31, the loop coil 23a in the back surface 34c of the storage body 32 and the loop coil 24a provided about the second opening 39 of the housing portion 31 are spaced away from each other. Thus, the power supply efficiency between the power receiving portion 23 and the power supplying portion 24 is low, and the light emitter 22 emits light to the storage portion 32a at a dark first luminance. This state is achieved by using a distance that is greater than the median value in the range of the distances that correspond to the second region Z2 (gradual reduction region) in FIG. 7. Therefore, the user can visually check articles in the storage portion 32a through the window 38 in the front surface 34a of the storage body 32 even in the dark. At this time, the light emitted by the light emitter 22 leaks out through the window 38, thus functioning as ambient lighting in the passenger compartment.

Figure 10:
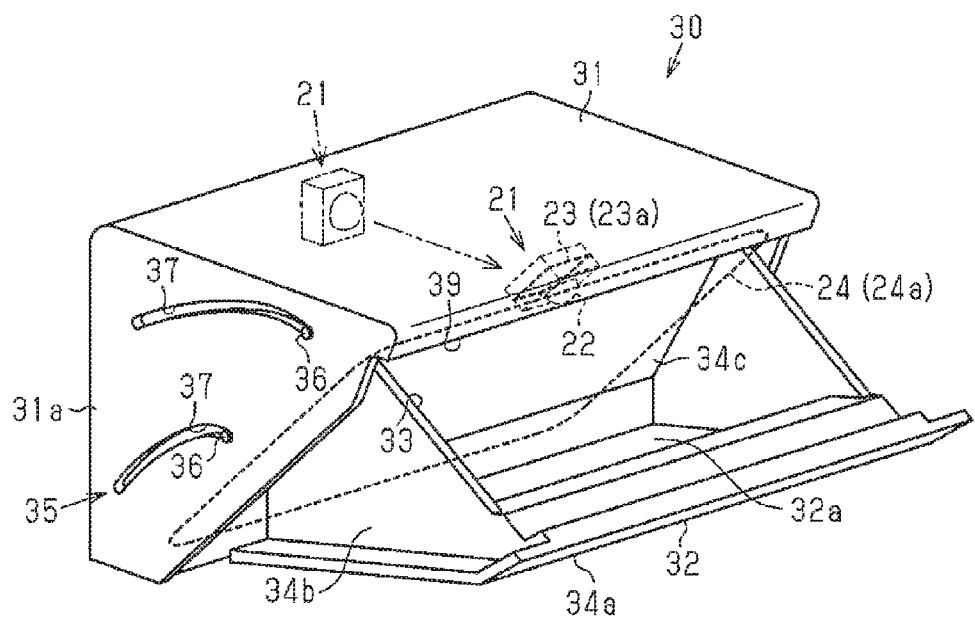
FIG. 10 is a perspective view of the storage device of FIG. 8, illustrating a state in which the storage body is extracted from the housing portion.
Figure 11:
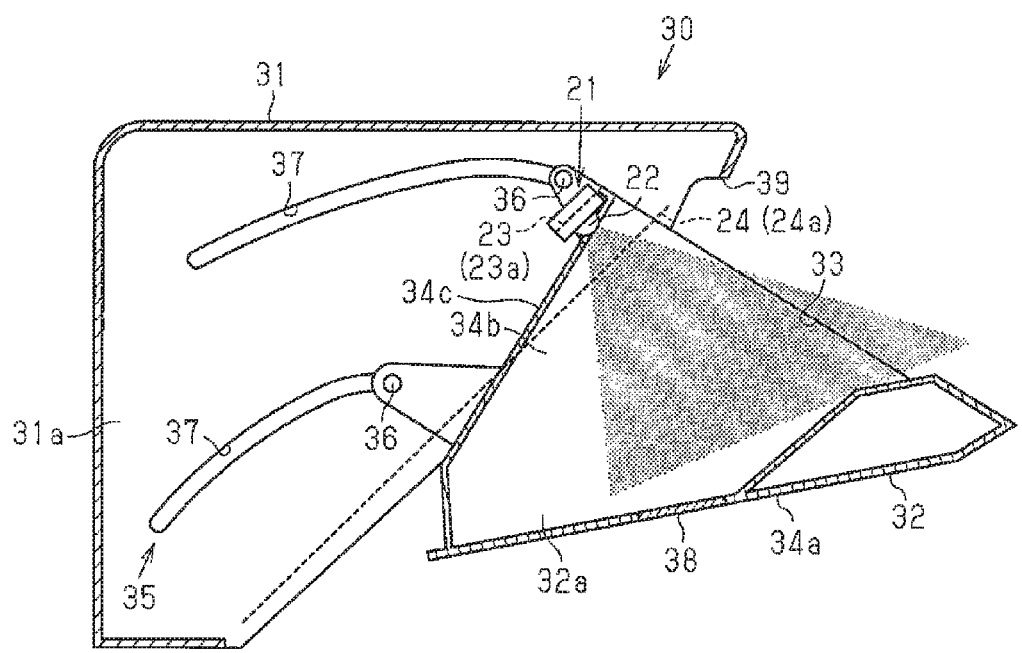
FIG. 11 is a cross-sectional view of the storage device of FIG. 8, illustrating a state in which the storage body is extracted from the housing portion.

As shown in FIGS. 10 and 11, when the storage body 32 is retracted from the housing portion 31, so that the first opening 33 of the storage body 32 is open, the back surface 34c of the storage body 32 is located in the vicinity of the second opening 39 of the housing portion 31. That is, the supplying-side loop coil 24a and the receiving-side loop coil 23a are brought closer to each other and the distance in between is reduced. Further, the central axis of the loop coil 24a and the central axis of the loop coil 23a are substantially parallel with each other and the angle between the axes is substantially 0 degrees. This increases the power supply efficiency between the power receiving portion 23 and the power supplying portion 24, and the light emitter 22 in the back surface 34c of the storage body 32 emits light to the storage portion 11a at the second luminance, which is higher than the first luminance. Thus, the storage portion 32a becomes brighter than when the storage body 32 is housed in the housing portion 31. This allows the user to reliably check the articles in the storage portion 32a. This state is achieved by using the first region Z1 in FIG. 7.

When the storage body 32 is extracted from the housing portion 31, the distance between the power receiving portion 23 and the power supplying portion 24 gradually decreases, and the angle in between gradually decreases, accordingly. This gradually increases the power supply efficiency. Thus, the luminance of the light emitter 22 is gradually increased from the first luminance to the second luminance as the storage body 32 is extracted from the housing portion 31. When the storage body 32 is housed in the housing portion 31, the distance between the power receiving portion 23 and the power supplying portion 24 gradually increases, and the angle in between gradually increases, accordingly. This gradually decreases the power supply efficiency. Thus, the luminance of the light emitter 22 is gradually decreased from the second luminance to the first luminance as the storage body 32 is housed in the housing portion 31. This state is achieved by using the second region Z2 (the gradual reduction region) in FIG. 7. As described above, the luminance of the light emitter 22 is changed in conjunction with extracting/retracting operation of the storage body 32. This allows the light emitter 22 to function as ambient lighting.

The storage device 30 of the above described second embodiment achieves the following advantages.

(5) When the storage body 32 (the second storage body) is extracted from the housing portion 31, the storage device 30 becomes brighter in accordance with the extracted amount of the storage body 32. When the storage body 32 is housed in the housing portion 31, the storage device 30 becomes darker in accordance with the moved amount in the direction in which the storage body 32 is housed. In this manner, the luminance of the light emitter 22 of the storage device 30 is changed in conjunction with extracting/retracting operation of the storage body 32. This allows the light emitter 22 to function as ambient lighting.

(6) Since the storage body 32, which is a movable body, is moved relative to the housing portion 31, which is a fixed body, it is difficult to supply power to the light emitter 22 through wires. In the storage device 30, power is supplied from the power supplying portion 24 of the housing portion 31, which is a fixed body, to the power receiving portion 23 of the storage body 32, which is a movable body, through wireless power supply. Thus, unlike the case of wired connection, problems such as breakage of wires do not occur.

(7) The direct current resonance method is used in the wireless power supply system. Thus, as in the above described item (3), the power supply efficiency is higher than the electromagnetic induction method in conformity with the Qi standard. The arrangement of the loop coils 24a and 23a can be highly flexibly determined.

(8) When the passenger compartment is dark, for example, during the night and the storage body 32 is housed in the housing portion 31, the light emitter 22 is turned on at the first luminance in conjunction with the headlights being turned on. This allows the user to visually check the state of storage portion 32a through the window 38. The light emitted at the first luminance by the light emitter 22 leaks out of the storage device 30 through the window 38 and functions as ambient lighting in the passenger compartment. Further, since the light emitter 22 becomes brighter when the storage body 32 is extracted from the housing portion 31, the user can visually check the articles inside. This allows the user to easily take out or put in articles.

The storage device 30 of the second embodiment may be modified as follows.

For the same reasons presented in the above described first embodiment, the receiving-side loop coil 23a and the light emitter 22 do not need to be incorporated in a single unit. The receiving-side loop coil 23a and the light emitter 22 may be incorporated in different units, and the units may be arranged at positions that are spaced apart from each other. The light emitter 22 may be located at any suitable position in the storage body 32 by extending the wires from the first resonance circuit on the power receiving side.

The light emitter 22 may be turned off completely when the storage body 32 is housed in the housing portion 31. In this case, the window 38 may be omitted. In this case, when the housing portion 31 houses the storage body 32, the receiving-side loop coil 23a only needs to be located outside the range in which power can be supplied by the supplying-side loop coil 24a.

The structure of the guide mechanism 35 is not limited to the one presented above. For example, guide projections 36 may be formed on the side portions 31a of the housing portion 31, and guide grooves 37 may be formed in the side portions 34b of the storage body 32. The storage body 32 may be extracted linearly with respect to the housing portion 31. The light emitter 22 does not need to be turned in conjunction with the headlights being turned on.

Third Embodiment

Figure 12:
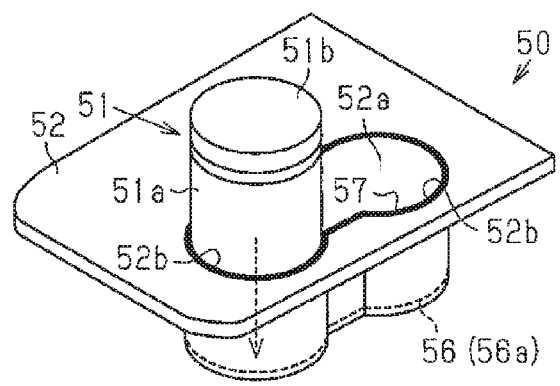
FIG. 12 is a perspective view of a holder device according to a third embodiment, illustrating a state in which a first object is placed in a storage holder.
Figure 13:
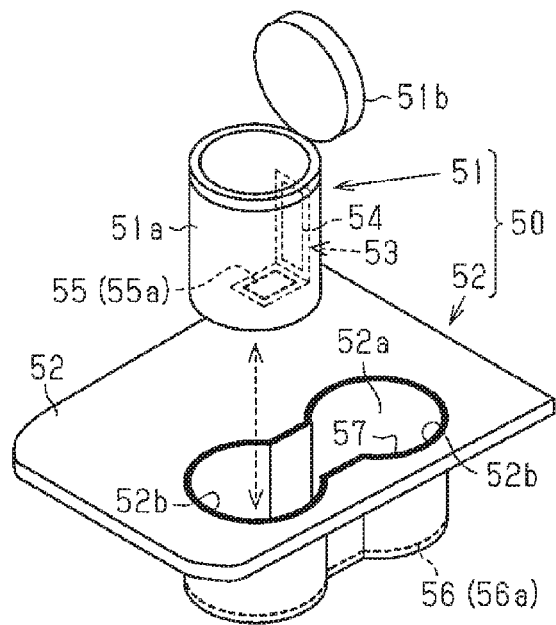
FIG. 13 is a perspective view of a storage holder device of FIG. 12, illustrating a state in which the first object is taken out of the storage holder.

Next, a holder device 50, which corresponds to a light emitting interior product according to the third embodiment, will be described with reference to FIGS. 12 to 14. As shown in FIGS. 1, 12, and FIG. 13, the holder device 50 is arranged in the center console 2 at a position adjacent to the shift lever 3. The holder device 50 includes a first object 51, which is cylindrical and has a closed end, and a storage holder 52, which accommodates the first object 51. The first object 51 is a movable body, which is movable without limit and can be carried away from the storage holder 52. The storage holder 52 is a fixed body that is fixed to the center console 2. The first object 51 may be, for example, a muffin-shaped ashtray. The first object 51 includes a cylindrical body 51a, which has a closed end and receives cigarette butts, and a lid 51b, which selectively opens and closes the upper opening of the cylindrical body 51a.

The storage holder 52 includes a storage recess 52a for storing the cylindrical first object 51. The bottom portion of the first object 51 is fitted in the storage recess 52a, so that the first object 51 is held in a stable posture. In the third embodiment, the storage holder 52 has two recessed sections adjacent to each other that constitute the storage recess 52a. The two recessed sections of the storage recess 52a are connected together, so that an 8-shaped space is formed as viewed in the direction facing the opening of the storage recess 52a.

A light emitting unit 53 for illuminating the surroundings is provided on the side surface and the bottom surface of the cylindrical body 51a of the first object 51. The light emitting unit 53 includes first light emitters 54, which are light emitting portions on the side of the cylindrical body 51a, and a power receiving portion 55, which is provided on the bottom surface of the cylindrical body 51a. Thus, the first object 51 corresponds to a first component. The first light emitters 54 may be, for example, LEDs or EL devices. The first light emitters 54 emit light to the surroundings of the cylindrical body 51a. The power receiving portion 55 includes a receiving-side loop coil 55a, which is arranged to be parallel with the bottom surface of the cylindrical body 51a. The loop coil 55a constitutes a part of a first resonance circuit on the power receiving side. The first resonance circuit includes a capacitor 55b (refer to FIG. 14), which is connected in parallel with the first light emitters 54.

The storage holder 52 has a power supplying portion 56, which performs wireless power supply to the first object 51. Thus, the storage holder 52 corresponds to a second component. The power supplying portion 56 includes a loop coil 56a, which constitutes a part of a second resonance circuit on the power supplying side. The loop coil 56a is provided on a surface that is parallel with the bottom surface of the storage recess 52a, so that when the first object 51 is fitted in one of the recessed sections of the storage recess 52a of the storage holder 52, the loop coil 56a faces the receiving-side loop coil 55a provided on the bottom surface of the cylindrical body 51a. In the third embodiment, the storage holder 52 has two recessed sections, which are adjacent to and connected to each other to form the storage recess 52a. Thus, the loop coil 56a is formed to have a large open area along the bottom surface that corresponds to the connected shape of the two recessed sections of the storage recess 52a.

The wireless power supply system employed in the third embodiment is the direct current resonance method, which is described above. As shown in FIG. 14, the power receiving portion 55 includes the first resonance circuit, which is constituted by connecting the receiving-side loop coil 55a and a capacitor 55b in parallel with the first light emitters 54. In the power supplying portion 56, the loop coil 56a and the capacitor 24b are connected in parallel. The capacitor 55b also functions as a power storing portion that stores some of the power received by the loop coil 55a. The capacitor 55b allows the first light emitters 54 to emit light for a certain period even if the power receiving portion 55 is separated away from the power supplying portion 56 to a position where power supply by the power supplying portion 56 cannot be performed.

As shown in FIGS. 12 and 13, the storage holder 52 has a second light emitter 57 about an opening 52b of the storage recess 52a. Like the first light emitter 54, the second light emitter 57 is constituted by an EL device or an LED. The second light emitter 57 is connected to the vehicle battery 25. That is, the second light emitter 57 receives power not through the wireless power supply, but through a path different from the one including the power supplying portion 56 and the power receiving portion 55. The second light emitter 57 emits light to the opening 52b of the storage recess 52a, so that the position of the opening 52b can be visually checked even in the dark. The second light emitter 57 is turned on, for example, in conjunction with the headlights being turned on.

As shown in FIG. 12, when the first object 51 is accommodated in one of the recessed sections of the storage recess 52a of the storage holder 52, the receiving-side loop coil 55a on the bottom surface of the cylindrical body 51a of the first object 51 and the supplying-side loop coil 56a on the bottom surface of the storage recess 52a are located close to each other and face each other. This increases the power supply efficiency between the power receiving portion 55 and the power supplying portion 56, so that the first light emitters 54 emit light. This state is achieved by using the first region Z1 in FIG. 7. In this case, the second light emitter 57 also illuminates the surroundings of the opening 52b of the storage recess 52a. This allows the user to visually check the position of the first object 51 accommodated in the storage holder 52 even in the dark.

When the first object 51 is taken out of the storage recess 52a of the storage holder 52 and the power receiving portion 55 of the first object 51 is separated away from the power supplying portion 56 to a position where power supply by the power supplying portion 56 cannot be performed, the power receiving portion 55 stops being supplied with power from the power supplying portion 56. This turns off the first light emitters 54. This state is achieved in a region where the distance is greater than L2.

In this case, the second light emitter 57 of the storage holder 52 continues emitting light and illuminating the surroundings of the opening 52b of the storage recess 52a.

When the first object 51 is fitted in one of the recessed sections of the storage recess 52a of the storage holder 52, the distance between the power receiving portion 55 and the power supplying portion 56 is gradually decreased, so that the power supply efficiency is gradually increased. Thus, the first light emitters 54 become brighter as the distance from the storage holder 52 decreases. This allows the user to visually check that the first object 51 is approaching the storage holder 52 even in the dark. This state is achieved by moving the power receiving portion 55 in the distance reducing direction within the second region Z2 in FIG. 7 (the gradual reduction region).

When the first object 51 is taken out of the storage holder 52, the distance between the power receiving portion 55 and the power supplying portion 56 is gradually increased, so that the power supply efficiency is gradually decreased. Thus, if the power receiving portion 55 does not have the capacitor 55b, which functions as a power storing portion, the first light emitters 54 become darker as the first object 51 is separated away from the storage holder 52 and are eventually turned off. This state is achieved by moving the power receiving portion 55 in the distance reducing direction within the second region Z2 in FIG. 7 (the gradual reduction region), so that the distance exceeds L2 at the end.

However, in the third embodiment, the receiving-side loop coil 55a and the capacitor 55b are connected in parallel with the first light emitters 54, and the capacitor 55b stores some of the power received by the loop coil 55a.

Thus, even when the distance between the power receiving portion 55 and the power supplying portion 56 becomes a distance at which the power supplying portion 56 cannot supply power to the power receiving portion 55, the first light emitters 54 continues to emit light for a certain time (for example, approximately dozen seconds) by the power stored in the capacitor 55b. Since the first object 51 is an ashtray in the third embodiment, the first object 51 is often used at a position spaced apart from the storage holder 52. When spaced apart from the storage holder 52, the first light emitters 54 of the first object 51 continue to emit light for a certain period of time by the power storing function of the capacitor 55b. This illuminates the hand holding the first object 51, allowing the first object 51 to be easily used as an ashtray.

As described above, the holder device 50 positively uses the second region Z2 (the gradual reduction region) of FIG. 7 to change the luminance of the first light emitters 54 in accordance with the distance between the first object 51 and the storage holder 52, so that the first light emitters 54 functions as ambient lighting. When the first object 51 is returned to the storage recess 52a, illumination of the second light emitter 57 guides the user to bring the first object 51 to the storage recess 52a.

The holder device 50 of the above described third embodiment achieves the following advantages.

(9) The holder device 50 becomes brighter as the first object 51 approaches the storage holder 52 so that the distance between the power receiving portion 55 and the power supplying portion 56 decreases. In this manner, the luminance of the first light emitters 54 is changed in conjunction with the distance between the storage holder 52 and the first object 51 in the holder device 50, so that the first light emitters 54 functions as ambient lighting.

(10) The holder device 50 supplies power to the power receiving portion 55 of the first object 51 from the power supplying portion 56 of the storage holder 52 through wireless power supply. Thus, unlike the case of wired connection, the movement distance is not limited by the length of the power code, and the first object 51 can be moved freely without limit in relation to the storage holder 52, which is a fixed body.

(11) The direct current resonance method is used in the wireless power supply system. Thus, as in the above described item (3), the power supply efficiency is higher than the electromagnetic induction method. Further, the direct current resonance method has a wider range in which the first light emitter 54 emits light in the distance between the power supplying portion 56 and the power receiving portion 55 than the electromagnetic induction method. The arrangement of the loop coils 56a and 55a therefore can be highly flexibly determined.

(12) The first light emitters 54 of the first object 51 and the second light emitter 57 of the storage holder 52 are turned on, for example, in conjunction with the headlights being turned on. This allows the user, even in the dark, to visually check the positions of the first object 51 and the storage holder 52 with the aid of light of the first light emitters 54 and the second light emitter 57. When the first object 51 is taken out of the storage holder 52, the first light emitters 54 of the first object 51 continues to emit light for a certain period of time even if the first object 51 is separated from the power supplying portion 56 by a distance at which the power supplying portion 56 cannot supply power. This improves the operability of the first object 51.

The holder device 50 of the third embodiment may be modified as follows.

The second light emitter 57 about the opening 52b of the storage recess 52a may be provided with a power receiving portion, and the power supplying portion 56 may supply power to the second light emitter 57 by the direct current resonance method.

The storage holder 52 may have a single recessed section in the storage recess 52a. The storage holder 52 may have three or more recessed sections in the storage recess 52a.

Other than an ashtray, the first object 51 may be a cup for containing a beverage.

The second light emitter 57 may be omitted from the storage holder 52.

The receiving-side loop coil 55a may be provided on the side surface of the cylindrical body 51a. In this case, the supplying-side loop coil 56a is preferably provided on the side surface of the storage recess 52a that faces the receiving-side loop coil 55a.

As long as the circuit structure allows wireless power supply by the direct current resonance method, the capacitors 24b, 55b may be connected in series with the loop coils 56a, 55a. Resistance elements may be connected in series with the loop coils 56a, 55a.

Fourth Embodiment

Figure 15A:
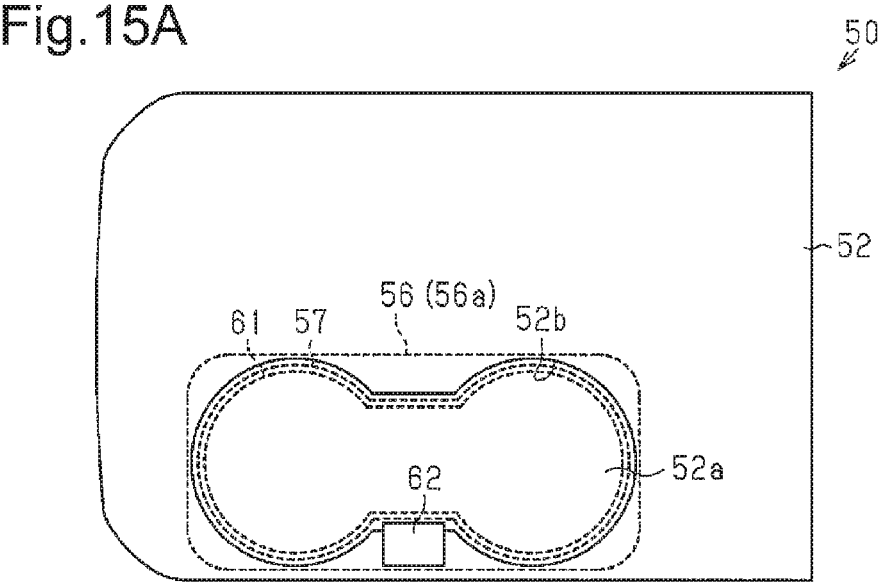
FIG. 15A is a plan view of a holder device according to a fourth embodiment.
Figure 15B:
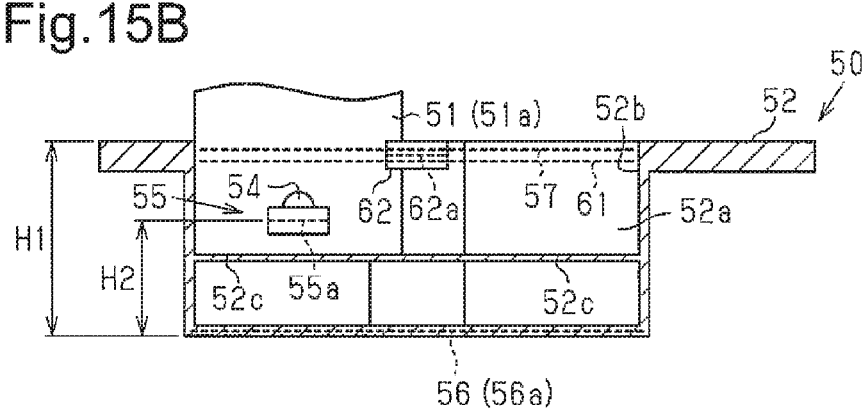
FIG. 15B is a cross-sectional view of the holder device of FIG. 15A.

Next, a light emitting interior product according to the fourth embodiment will be described with reference to FIGS. 15A, 15B, and 16. The fourth embodiment is a modification of the holder device 50 of the third embodiment. As shown in FIGS. 15A and 15B, in the fourth embodiment, a loop coil 56a, which constitutes a part of the power supplying portion 56, is provided on a surface parallel with the bottom surface of the storage holder 52. In addition to the second light emitter 57, a third light emitter 61, which is a light emitting portion, is provided about the opening 52b of the storage recess 52a. The second light emitter 57 and the third light emitter 61 are located about and close to the opening 52b. The second light emitter 57 and the third light emitter 61 are covered with a translucent cover to form a single light emitting portion. Like the second light emitter 57, the third light emitter 61 is formed by an EL device or an LED and emits light to the opening 52b.

The third light emitter 61 is supplied with power by a power receiving portion 62, which is provided about the opening 52b of the storage recess 52a. The power receiving portion 62 includes a loop coil 62a, which constitutes a part of a third resonance circuit on the power receiving side. The loop coil 62a is arranged about or in the vicinity of the opening 52b of the storage holder 52. The third resonance circuit includes a capacitor 62b, which is connected in parallel with the third light emitter 61. As described below, the power receiving portion 62 is supplied with power from the power supplying portion 56 of the storage holder 52 via the power receiving portion 55 of the first object 51.

As shown in FIG. 15B, the first object 51 is accommodated in the storage holder 52 such that the bottom surface of the first object 51 contacts a bottom surface 52c of the storage recess 52a. The distance from the bottom surface on which the loop coil 56a of the power supplying portion 56 is provided to the power receiving portion 62 provided in the vicinity of the upper surface of the storage holder 52 (height H1) is set to a distance at which the wireless power supply cannot be performed by the direct current resonance method. The loop coil 56a of the power supplying portion 56 is provided at the outer periphery close to the bottom surface of the storage holder 52. In contrast, the distance from the bottom surface of the storage holder 52 to the loop coil 55a, which is provided in the first object 51, corresponds to a height to a middle portion of the storage holder 52 in the vertical direction (H2). The height (H2) is a height at which the power supply by the direct current resonance method is possible from the power supplying portion 56.

When the first object 51 is accommodated in the storage recess 52a, the distance between the loop coil 55a of the power receiving portion 55 of the first object 51 and the loop coil 56a of the power supplying portion 56 located on the bottom surface of the storage holder 52 is within a range in which the power supplying portion 56 can supply power to the power receiving portion 55. Thus, the power receiving portion 55 of the first object 51 is supplied with power by the power supplying portion 56 located on the bottom surface of the storage holder 52. Further, the distance between the power receiving portion 55 of the first object 51 accommodated in the storage recess 52a and the power receiving portion 62 provided on the upper surface of the storage holder 52 is within a range in which the power supply by the direct current resonance method is possible. Thus, the power receiving portion 55 of the first object 51 functions as a relay. That is, the power from the power supplying portion 56 is supplied to the power receiving portion 62 on the upper surface of the storage holder 52 via the power receiving portion 55. That is, a resonance field that changes with time is generated between the power receiving portion 55 and the power receiving portion 62, and power is supplied across the space from the power receiving portion 55 to the power receiving portion 62 by causing the first resonance circuit and the third resonance circuit to resonate with each other. In this case, the first resonance circuit of the power receiving portion 55 corresponds to the resonance circuit on the power supplying side, and the third resonance circuit of the power receiving portion 62 corresponds to the resonance circuit on the power receiving side. In this manner, the third light emitter 61 is supplied with power that has been relayed by the power receiving portion 55 of the first object 51 only when the first object 51 is accommodated in the storage recess 52a.

When the first object 51 is accommodated in the storage recess 52a of the storage holder 52, the receiving-side loop coil 55a in the cylindrical body 51a of the first object 51 and the supplying-side loop coil 56a on the bottom surface of the storage holder 52 are located close to each other and face each other. This increases the power supply efficiency between the power receiving portion 55 and the power supplying portion 56, so that the first light emitters 54 emit light. This state is achieved by using the first region Z1 in FIG. 7. Also, the second light emitter 57 also illuminates the surroundings of the opening 52b of the storage recess 52a. This allows the user to visually check the position of the first object 51 accommodated in the storage holder 52 even in the dark. Further, power is supplied from the power supplying portion 56 to the power receiving portion 62 via the power receiving portion 55 of the first object 51, so that the third light emitter 61 is turned on. That is, the second light emitter 57 and the third light emitter 61 are both turned on at the opening 52b of the storage recess 52a. This state is also achieved by using the first region Z1 in FIG. 7.

The second light emitter 57 and the third light emitter 61 are covered with a translucent cover to form a single light emitting portion.

Therefore, when the first object 51 is accommodated in the storage recess 52a in a case where the emission colors of the second light emitter 57 and the third light emitter 61 are the same, the area about the opening 52b of the storage recess 52a is illuminated at a higher illuminance by the second light emitter 57 and the third light emitter 61 than that before the first object 51 is accommodated in the storage recess 52a.

In a case where the emission colors of the second light emitter 57 and the third light emitter 61 are set to be different from each other, the area about the opening 52b is illuminated by the second light emitter 57 and the third light emitter 61 with different colors before and after the first object 51 is accommodated in the storage recess 52a. For example, in a case where the emission colors of the second light emitter 57 and the third light emitter 61 are set to be red and green, respectively, the opening 52b of the storage recess 52a is illuminated with yellow light, which is mixture of red and green. That is, when the first object 51 is accommodated in the storage recess 52a, the color about the opening 52b is changed from red to yellow.

When the first object 51 is taken out of the storage recess 52a of the storage holder 52, and the power receiving portion 55 of the first object 51 is separated away from the power supplying portion 56 to a position where power supply from the power supplying portion 56 cannot be performed, the power supply from the power supplying portion 56 to the power receiving portion 55 is stopped as in the third embodiment, and the first light emitters 54 are turned off. This state is achieved in a region where the distance is greater than L2.

In this state, the second light emitter 57 of the storage holder 52 continues to illuminate the surroundings of the opening 52b of the storage recess 52a. Since the power supply via the power receiving portion 55 is stopped, the third light emitter 61 is turned off.

When the first object 51 is fitted in one of the recessed sections of the storage recess 52a of the storage holder 52, the distance between the power receiving portion 55 and the power supplying portion 56 is gradually decreased, so that the power supply efficiency is gradually increased. Thus, the luminance of the first light emitters 54 increases as the power receiving portion 55 is brought closer to the power supplying portion 56.

When the first object 51 is taken out of the storage holder 52, the distance between the power receiving portion 55 and the power supplying portion 56 is gradually increased, so that the power supply efficiency is gradually decreased. Thus, if the power receiving portion 55 does not have the capacitor 55b, which functions as a power storing portion, the luminance of the first light emitters 54 becomes lower as the first object 51 is separated away from the storage holder 52. The first light emitters 54 are eventually turned off.

Figure 16:
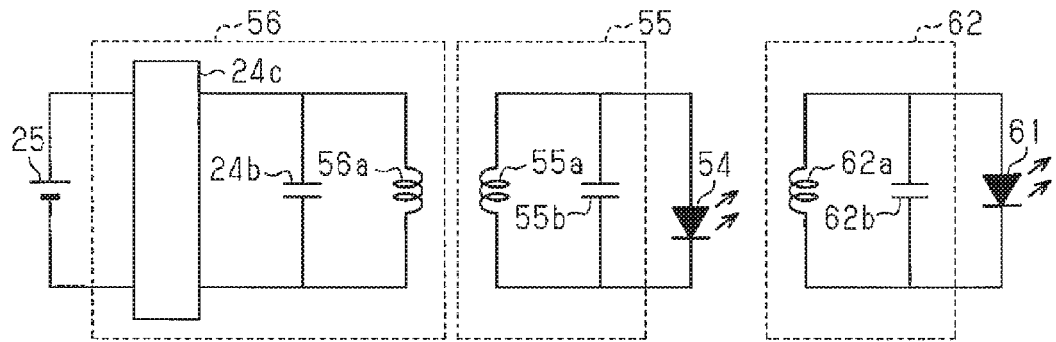
FIG. 16 is a circuit diagram of a wireless power supply system of a direct current resonance method used in the holder device of FIG. 15A.

However, as in the third embodiment, the receiving-side loop coil 55a and the capacitor 55b are connected in parallel with the first light emitters 54 in the fourth embodiment as shown in FIG. 16. The capacitor 55b stores some of the power received by the loop coil 55a.

Thus, even when the distance between the power receiving portion 55 and the power supplying portion 56 becomes a distance at which the power supply cannot be performed, the first light emitters 54 continue to emit light for a certain time (for example, approximately dozen seconds) by the power stored in the capacitor 55b.

In the fourth embodiment, the receiving-side loop coil 62a and the capacitor 62b are connected in parallel with the third light emitters 61 as shown in FIG. 16, and the capacitor 62b stores some of the power received by the loop coil 62a.

Thus, even if the power supply by the power receiving portion 55 is stopped while the first object 51 is being taken out of the storage holder 52, the third light emitter 61 continues to emit light for a certain time by the power stored in the capacitor 62b.

In addition to the above described advantages (9) to (12), the holder device 50 of the fourth embodiment achieves the following advantage.

(13) Even at a position where power supply from the power supplying portion 56 cannot be performed, the power receiving portion 62 can be supplied with power from the power supplying portion 56 via the power receiving portion 55. Thus, the third light emitter 61 is turned on when the first object 51 is accommodated in the storage recess 52a. Thus, the third light emitter 61 can be turned on in conjunction with accommodation of the first object 51 into the storage recess 52a. This allows the third light emitter 61 to function as ambient lighting.

In addition to the modifications described in the third embodiment, the fourth embodiment may be modified as follows.

The opening 52b of the storage holder 52 may be provided only with the third light emitter 61, and the second light emitter 57 may be omitted.

As long as the circuit structure allows wireless power supply by the direct current resonance method, the capacitors 24b, 55b, 62b may be connected in series with the loop coils 56a, 55a, 62a. Resistance elements may be connected in series with the loop coils 56a, 55a, 62a.

Two or more power receiving portions that function as relays may be provided between the power supplying portion 56 and the power receiving portion 62 that is located at the farthest position from the power supplying portion 56.

Fifth Embodiment

Next, an air conditioner register unit 70, which corresponds to a light emitting interior product according to the fifth embodiment, will be described with reference to FIGS. 1 and 17. The register unit 70 includes vents 71 for conditioned air, a bezel 72 attached to the instrument panel 1, and grilles 73 provided in the vents 71. The bezel 72 is a fixed body attached to the instrument panel 1. Two rectangular vents 71 are provided in the bezel 72. Each vent 71 has a grille 73, which has louvers 74 for adjusting the air flow direction. The louvers 74 are rectangular thin plates that are arranged to be parallel with the long sides of the vents 71.

The louvers 74 are parallel with one another, and a louver 74 at the center has a manipulation portion 75. The manipulation portion 75 is manipulated to adjust the inclination of the louvers 74, so that the air flow direction is regulated. Each louver 74 is pivotally supported by the bezel 72 at the opposite ends. The louvers 74 in each set are connected to one another. When the manipulation portion 75 is pivoted vertically, the louvers 74 are pivoted vertically, so that the air flow direction is adjusted. The manipulation portion 75 is a movable body, which moves in relation to the bezel 72. Each manipulation portion 75 is provided in the grille 73 of each vent 71.

Each manipulation portion 75 has a rectangular plate-like housing, which incorporates a light emitting unit 76. The light emitting unit 76 includes a light emitter 77, which is a light emitting portion, and a power receiving portion 78, which are mounted on a circuit board. Thus, each manipulation portion 75 corresponds to a first component. The light emitter 77 is mounted on the circuit board to emit light into the passenger compartment. The power receiving portion 78 includes a loop coil 78a, which constitutes a part of a first resonance circuit on the power receiving side. The loop coil 78a is mounted on the circuit board.

The bezel 72 has a power supplying portion 79, which wirelessly supplies power to the power receiving portions 78. Thus, the bezel 72 corresponds to a second component. The power supplying portion 79 includes a loop coil 79a, which constitutes a part of a second resonance circuit on the power supplying side. The loop coil 79a is provided to surround the two vents 71 and supplies power to the two power receiving portions 78 in the grilles 73 by the direct current resonance method. The distance between the power supplying portion 79 and each power receiving portion 78 is within a range in which power supply to the power receiving portions 78 by the power supplying portion 79 is possible.

Figure 17:
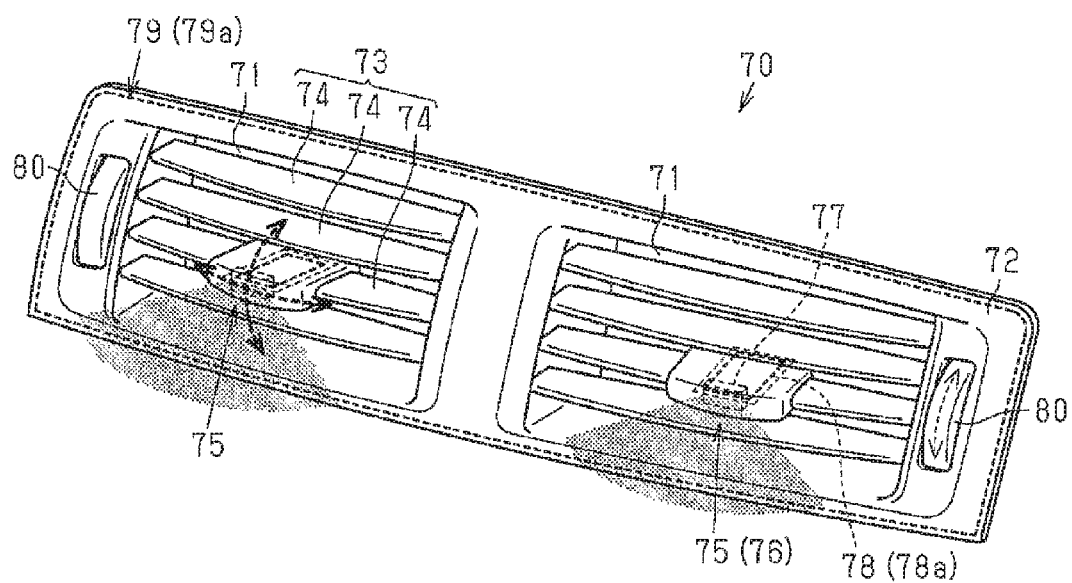
FIG. 17 is a perspective view illustrating an air conditioner register unit according to a fifth embodiment installed in an instrument panel.

When the air flow direction of the register unit 70 is changed, each manipulation portion 75 is moved vertically and horizontally as indicated by arrows in FIG. 17. This changes the distance and the angle between the loop coil 79a of the power supplying portion 79 in the bezel 72, which is a fixed body, and the loop coil 78a of the power receiving portion 78 in the manipulation portion 75, which is a movable body. Accordingly, the power supply efficiency between the power supplying portion 79 and the power receiving portion 78 is changed, so that the luminance of the light emitter 77 is changed. This state is achieved by using the second region Z2 (the gradual reduction region) in FIG. 7. The manipulation portion 75 is then conspicuous even in a dark passenger compartment, allowing the user to visually check the position of the manipulation portion 75. That is, the light emitters 77 of the register unit 70 function as ambient lighting.

The register unit 70 of the above described fifth embodiment achieves the following advantages.

(14) The louvers 74 attached to the bezel 72 are thin plates, and a manipulation portion 75 is arranged in each set of louvers 74. The manipulation portion 75 is provided with a light emitter 77. It is thus difficult to supply power to the light emitter 77 through wires. In this regard, the fifth embodiment employs the direct current resonance method as the method for supplying power to the light emitters 77. Thus, power can be efficiently supplied from the power supplying portion 79, which is provided in the bezel 72, or a fixed body, to the power receiving portion 78, which is provided in each manipulation portion 75, or a movable body. Further, since no power code is exposed, the appearance is not degraded. Also, breakage of wires does not occur.

(15) The distance and the angle between each power receiving portion 78 and the power supplying portion 79 change in accordance with the manipulation direction of the manipulation portion 75, which changes the luminance of the light emitter 77. This allows the light emitter 77 to function as ambient lighting.

The register unit 70 of the fifth embodiment may be modified as follows.

In the fifth embodiment, the single loop coil 79a, which constitutes a part of the power supplying portion 79, is provided to surround the two vents 71 of the bezel 72 arranged side by side. However, two loop coils 79a may be provided to respectively surround the vents 71.

A manipulation portion 80 for adjusting the flow rate of conditioned air is provided beside each vent 71. The manipulation portion 80 is manipulated vertically to adjust the opening degree of a passage in the air conditioner. The manipulation portion 80 may be provided with a light emitter 77 and a power receiving portion 78. In this case also, when the manipulation portion 80 is manipulated vertically, the distance and the angle between the power receiving portion 78 and the power supplying portion 79 are changed. Accordingly, the luminance of the light emitter 77 is changed. The manipulation portion 80 may be configured to be manipulated horizontally.

Sixth Embodiment

Next, an air conditioner register unit 90, which corresponds to a light emitting interior product according to the sixth embodiment, will be described with reference to FIG. 18. The register unit 90 includes a circular vent 91 for conditioned air, a bezel 92, which is attached to the instrument panel 1, and a register 93, which is attached to the vent 91. The bezel 92 is a fixed body attached to the instrument panel 1. The register 93, which is provided in the vent 91, is a cross-shaped manipulation portion. When the register 93 is pivoted vertically and horizontally or rotated in the circumferential direction of the vent 91, the inclination of the louvers in the air passage is adjusted.

The register 93 has a light emitting unit 97 at the center, which corresponds to the intersection of the cross. The light emitting unit 97 includes a light emitter 94, which is a light emitting portion, and a power receiving portion 95, and a circuit board 95b. Thus, the register 93 corresponds to a first component. The light emitter 94 and the power receiving portion 95 are mounted on the circuit board 95b. The light emitter 94 is mounted on the circuit board 95b to emit light into the passenger compartment. The power receiving portion 95 includes a loop coil 95a, which constitutes a part of a first resonance circuit on the power receiving side. The loop coil 95a is mounted on the circuit board 95b.

The bezel 92 has a power supplying portion 96, which supplies power to the power receiving portion 95. Thus, the bezel 92 corresponds to a second component. The power supplying portion 96 includes a loop coil 96a, which constitutes a part of a second resonance circuit on the power supplying side. The loop coil 96a is provided to surround the circular vent 91 and supplies power to the power receiving portion 95 in the register 93 by the direct current resonance method. The distance between the power supplying portion 96 and power receiving portion 95 is within a range in which power supply to the power receiving portion 95 by the power supplying portion 96 is possible.

When adjusting the air flow direction, the register 93 of the register unit 90 is pivoted vertically and horizontally and rotated in the circumferential direction of the vent 91. This changes the angle and the distance between the loop coil 96a of the power supplying portion 96 in the bezel 92, which is a fixed body, and the loop coil 95a of the power receiving portion 95 in the register 93, which is a movable body. Accordingly, the power supply efficiency between the power supplying portion 96 and the power receiving portion 95 is changed, so that the luminance of the light emitter 94 is changed. This state is achieved by using the second region Z2 (the gradual reduction region) in FIG. 7. The register 93 is then conspicuous even in a dark passenger compartment, readily allowing the user to visually check the position of the register 93. That is, the light emitter 94 of the register unit 90 functions as ambient lighting.

The register unit 90 of the above described sixth embodiment achieves the following advantages.

(16) The register 93 attached to the bezel 92 is a rotational body, and the light emitter 94 is arranged in the register 93. It is thus difficult to supply power to the light emitter 94 through wires. In this regard, the sixth embodiment employs the direct current resonance method as the method for supplying power to the light emitters 94. This allows power to be efficiently supplied from the power supplying portion 96 to the power receiving portion 95. Further, since no power code is exposed, the appearance is not degraded. Also, breakage of wires does not occur.

(17) Vertical and horizontal pivoting motions of the register 93 and rotation of the register 93 in the circumferential direction of the vent 91 change the angle and the distance between the power receiving portion 95 and the power supplying portion 96. This changes the luminance of the light emitter 94, so that the light emitter 94 functions as ambient lighting.

The register unit 90 of the sixth embodiment may be modified as follows.

The loop coil 96a of the power supplying portion 96 in the bezel 92 may be provided in a base 98 coupled to the bezel 92. The bezel 92 and the base 98 may each be provided with a loop coil 96a.

Seventh Embodiment

Figure 19A:
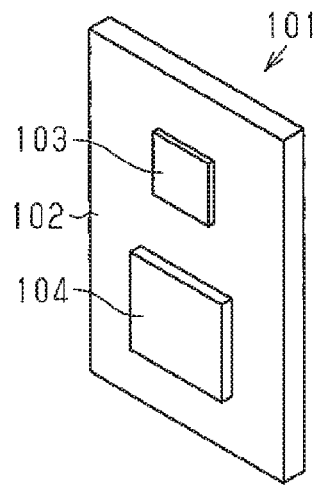
FIG. 19A is a perspective view of a circuit board of a light emitting unit according to a seventh embodiment, showing a first surface, on which a light emitter and an electronic component are mounted.
Figure 19B:
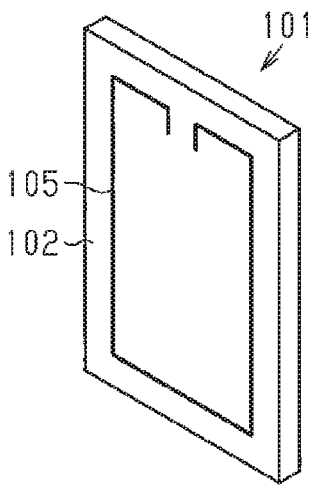
FIG. 19B is a perspective view of the circuit board of the light emitting unit of FIG. 19A, showing a second surface, on which a loop coil is provided.

With reference to FIGS. 19A and 19B, the concrete structure of a light emitting unit 101, which includes the power receiving unit used in the first to sixth embodiment, will be described. As shown in FIGS. 19A and 19B, the light emitting unit 101 of the seventh embodiment includes a rigid or flexible circuit board 102. A light emitter 103, which is a light emitting portion, and an electronic component 104, which constitutes a power receiving portion, are mounted on a first surface of the circuit board 102. A loop coil 105 is patterned on a second surface of the circuit board 102. The ends of the loop coil 105 are passed through through-holes (not shown) to be electrically connected to the electronic component 104 and the light emitter 103 formed on the first surface. Since the loop coil 105 is formed on the circuit board, the present example is suitable for mass production.

Eighth Embodiment

Figure 20A:
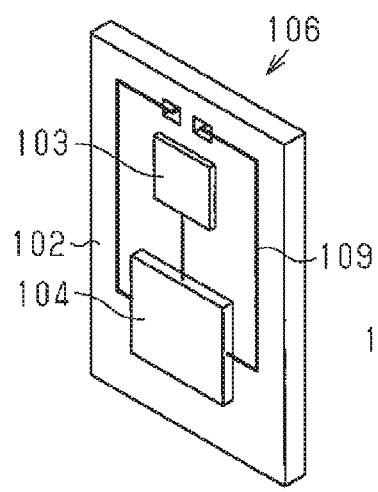
FIG. 20A is a perspective view of a circuit board of a light emitting unit according to an eighth embodiment, showing a first surface, on which a light emitter and an electronic component are mounted.
Figure 20B:
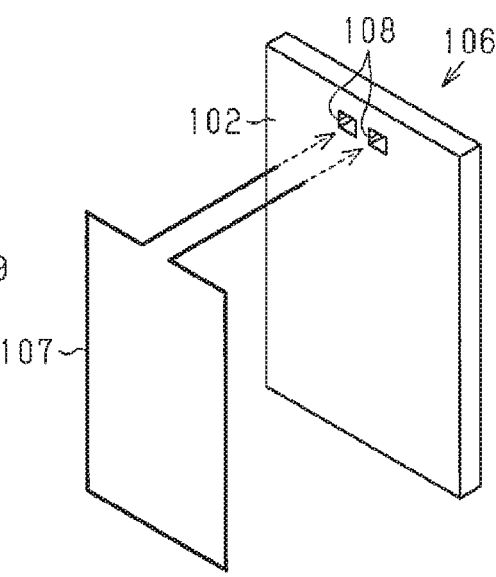
FIG. 20B is an exploded perspective view showing the circuit board and the loop coil of the light emitting unit of FIG. 20A.

As shown in FIGS. 20A and 20B, a light emitting unit 106 of the eighth embodiment includes a circuit board 102. A light emitter 103 and an electronic component 104, which constitutes a power receiving portion, are mounted on a first surface of the circuit board 102. A loop coil 107 is provided on a second surface of the circuit board 102. The loop coil 107 is formed by pressing a copper plate and bonded to the second surface of the circuit board 102. The ends of the loop coil 107 are passed through through-holes 108 formed in the circuit board 102 to be electrically connected to a conductor pattern 109, which is formed on the first surface of the circuit board 102 and electrically connected to the light emitter 103 and the electronic component 104.

The light emitting units 101, 106 of the seventh and eighth embodiments may be modified as follows.

In the seventh embodiment, the light emitter 103, the electronic component 104, and the loop coil 105 may be provided on the same surface of the circuit board 102. In the eighth embodiment, the light emitter 103, the electronic component 104, and the loop coil 107 may be provided on the same surface of the circuit board 102.

The loop coil 105 of the seventh embodiment and the loop coil 107 of the eighth embodiment do not necessarily need to be formed on the circuit board 102. That is, the loop coils 105, 107 may be formed by winding a copper wire or a fine wire into a loop and fixed to another member.

Ninth Embodiment

FIGS. 21A and 21B are diagrams showing the circuit board used in the light emitting unit 76 of the register unit 70 shown in FIG. 17. As shown in FIG. 21A, the manipulation portion 75 for adjusting the air flow direction includes a flat plate-shaped housing 110, which corresponds to one of the thin plate-like louvers 74. The housing 110 incorporates a circuit board 111. As shown in FIG. 21B, an electronic component 104, which forms the power receiving portion 78, is mounted on a first surface of the circuit board 111. The loop coil is provided on a second surface of the circuit board 111. A light emitter 77 is mounted on the circuit board 111. The light emitter 77 has an end face that is perpendicular to the first surface of the circuit board 111, and the end face forms a light emitting surface. That is, the direction in which light is emitted by the light emitter 77 is parallel with the first surface of the circuit board 111. The circuit board 111 is arranged in the housing 110 such that light is emitted through an end face of the light emitter 77 that faces the passenger compartment.

Tenth Embodiment

Figure 18:
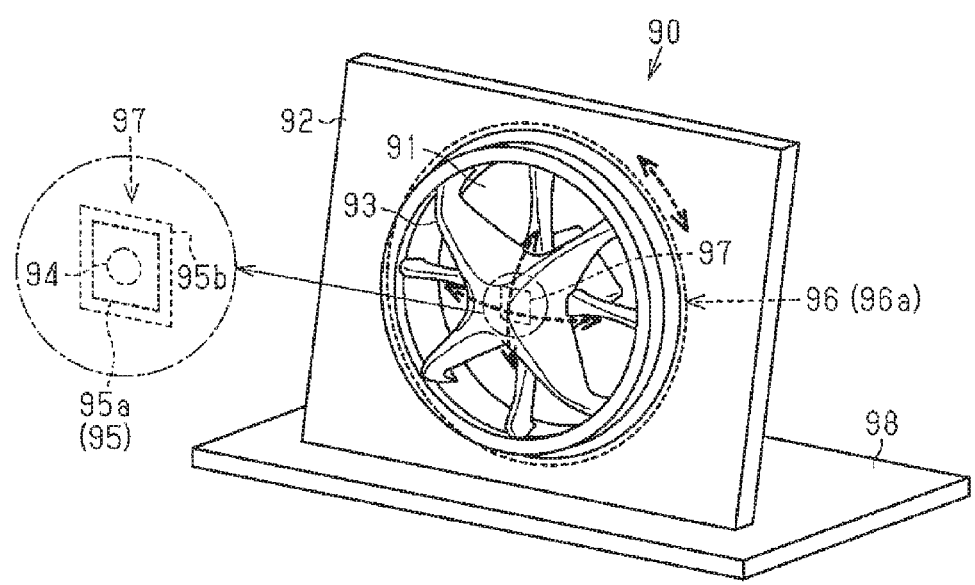
FIG. 18 is a perspective view illustrating an air conditioner register unit according to a sixth embodiment installed in an instrument panel.

FIGS. 22A and 22B are diagrams showing the circuit board used in the light emitting unit 97 of the register unit 90 shown in FIG. 18. As shown in FIG. 22A, the light emitting unit 97 is provided at the center, which corresponds to the intersection of the cross, of the register 93, which rotates relative to the bezel 92. The light emitting unit 97 incorporates a circuit board 112. As shown in FIG. 22B, an electronic component 104, which forms the power receiving portion 95, is mounted on a first surface of the circuit board 112. The loop coil is provided on a second surface of the circuit board 112. A light emitter 94 is mounted on the first surface of the circuit board 112. The light emitting surface of the light emitter 94 is parallel with the first surface of the circuit board 112. That is, the direction in which light is emitted by the light emitter 94 is perpendicular to the first surface of the circuit board 112. The circuit board 112 is arranged at the center of the register 93 such that light is emitted into the passenger compartment.

Eleventh Embodiment

A light emitting interior product according to the eleventh embodiment will now be described with reference to FIGS. 23 to 26. In the eleventh embodiment, the light emitting interior product is a storage device. Differences from the first embodiment will mainly be discussed below.

Figure 23:
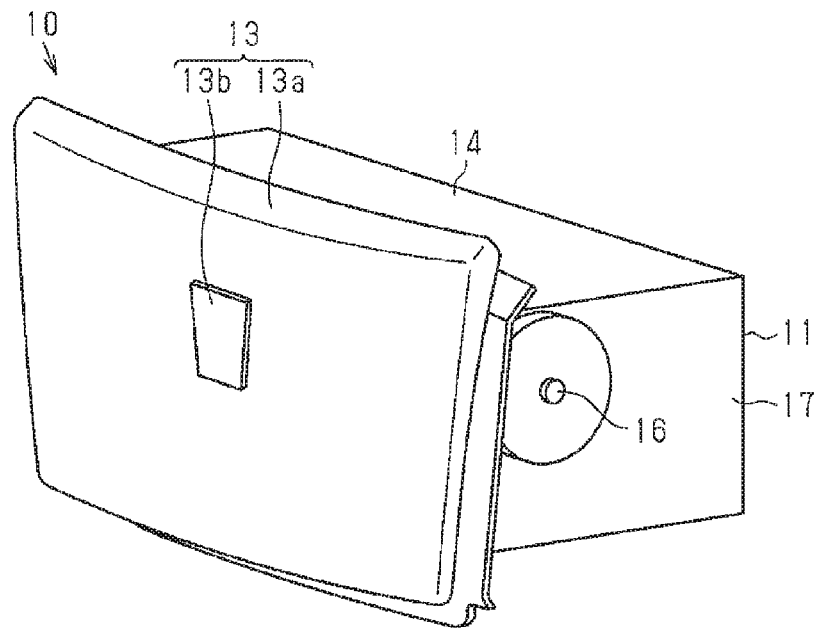
FIG. 23 is a perspective view of a storage device, which is a light emitting interior product according to an eleventh embodiment, illustrating a state in which the storage portion is closed.
Figure 24:
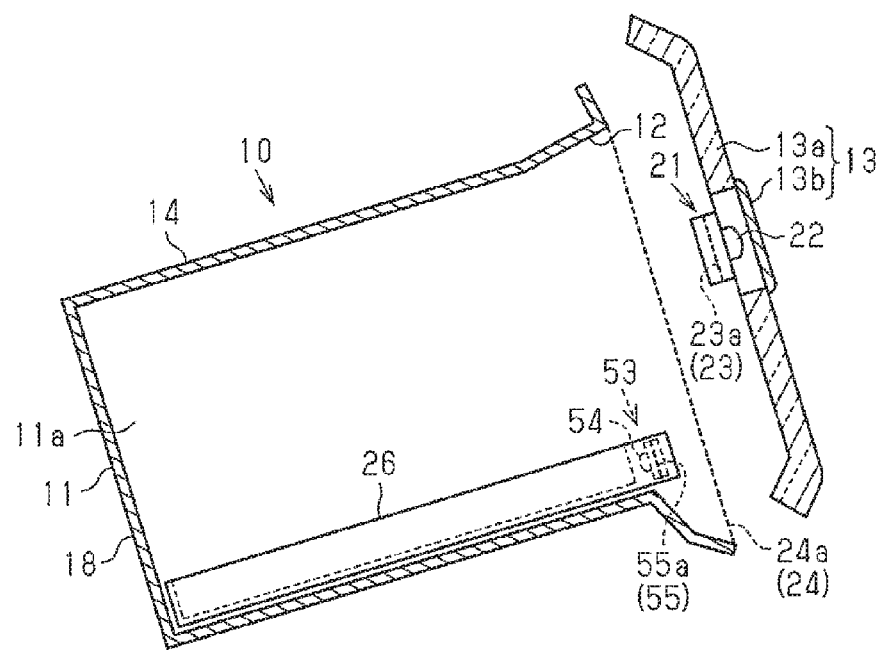
FIG. 24 is a cross-sectional view of the storage device of FIG. 23, illustrating a state in which the storage portion is closed.

In the eleventh embodiment, most of the lid 13 of the storage device 10 is formed by an optically transparent base member 13a as shown in FIGS. 23 and 24. An emblem 13b, which is an ornamental member, is attached to a surface of the base member 13a that faces occupants. The emblem 13b has no or little optical transparency. The lid 13 has a light emitting unit 21 behind the emblem 13b (on the left side as viewed in FIG. 24). As in the first embodiment, the light emitting unit 21 includes a light emitter 22, which is formed by an LED or an EL device, and a power receiving portion 23 for wireless power supply. Thus, the lid 13 corresponds to a first component. A loop coil 23a in the power receiving portion 23 constitutes a part of a first resonance circuit on the power receiving side (refer to FIG. 6) and is arranged to be parallel with the base member 13a. The light emitter 22 emits light to the base member 13a and the emblem 13b to illuminate the part of the base member 13a around the emblem 13b.

A storage body 11 (a third storage body, a fourth storage body) accommodates a tray 26 for storing small articles on the bottom portion of the storage portion 11a. The tray 26 is formed independently from the storage portion 11a and can be taken out of and put into the storage portion 11a through the opening 12. A light emitting unit 53 is provided in the front part of the tray 26 (the right portion as viewed in FIG. 24). The light emitting unit 53 emits light rearward to illuminate the tray 26. As in the third embodiment, the light emitting unit 53 includes a light emitter 54, which is formed by an LED or an EL device, and a power receiving portion 55 for wireless power supply. Thus, the tray 26 corresponds to a first component. A loop coil 55a in the power receiving portion 55 constitutes a part of a second resonance circuit on the power receiving side. The second resonance circuit includes a capacitor 55b (refer to FIG. 14), which is connected in parallel with the light emitter 54. The capacitor 55b also functions as a power storing portion that stores some of the power received by the loop coil 55a.

The storage body 11 of the storage device 10 has a power supplying portion 24, which performs wireless power supply to the light emitting units 21, 53. Thus, the storage body 11 (the third storage body, the fourth storage body) corresponds to a second component. The loop coil 24a constitutes a part of a third resonance circuit on the power supplying side in the power supplying portion 24 (refer to FIG. 6) and is provided about the opening 12. The power supplying portion 24 uses, as a power source, the vehicle battery 25, which is a direct-current power source, and supplies the power to the power receiving portions 23, 55 by the direct current resonance method.

In the storage device 10, the storage body 11 constitutes a fixed body, and the lid 13 and the tray 26 each constitute a movable body.

Other than these differences, the eleventh embodiment is the same as the first embodiment. Thus, like or the same reference numerals are given to those components that are like or the same as the corresponding components described above in the first embodiment and detailed explanations are omitted.

Operation of the eleventh embodiment, which is configured as described above, will now be described.

FIGS. 23 and 24 illustrate a state in which the tray 26 is entirely accommodated in the storage portion 11a of the storage body 11, and the lid 13 is arranged to be substantially perpendicular to the top plate 14 of the storage body 11. The opening 12 of the storage body 11 is closed by the lid 13.

The supplying-side loop coil 24a and the receiving-side loop coil 23a are brought close to each other and the distance in between is short. The central axis of the loop coil 24a and the central axis of the loop coil 23a are parallel with each other and the angle between the axes is substantially 0 degrees. Thus, the power supply efficiency between the power receiving portion 23 and the power supplying portion 24 is high.

The light emitter 22 emits light toward the base member 13a and the emblem 13b. The emitted light passes through the base member 13a, but scarcely passes through the emblem 13b. The base member 13a of the lid 13 is illuminated about the emblem 13b. This gives the user an impression that the emblem 13b is floating.

The supplying-side loop coil 24a and the receiving-side loop coil 55a are brought close to each other and the distance in between is short. Thus, the power supply efficiency between the power receiving portion 55 and the power supplying portion 24 is high.

The light emitter 54, which is provided at the front of the tray 26, emits light rearward. The emitted light illuminates the tray 26 and the surroundings.

Figure 25:
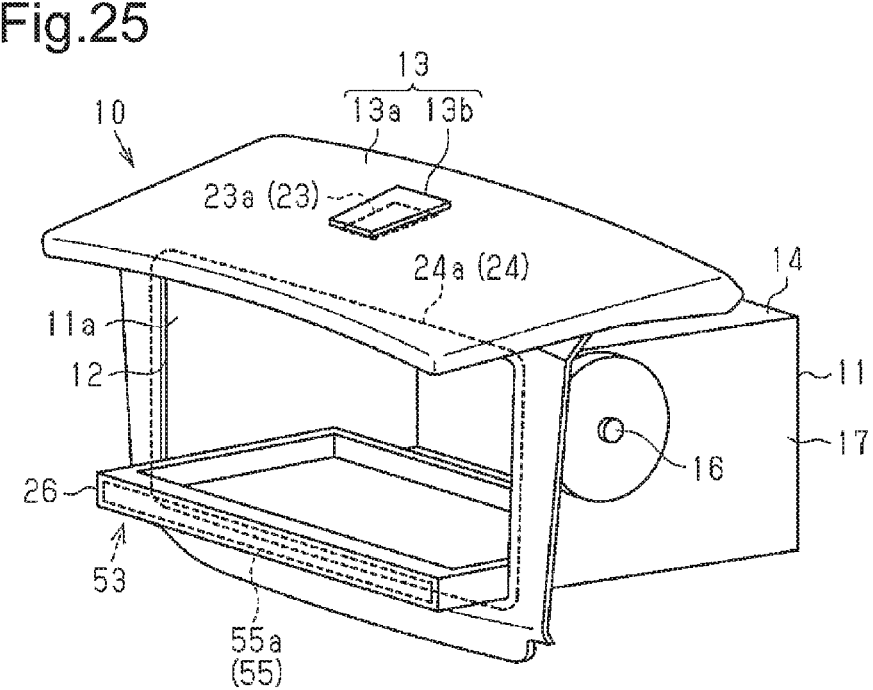
FIG. 25 is a perspective view of the storage device of FIG. 23, illustrating a state in which the storage portion is open and the tray is slightly extracted.
Figure 26:
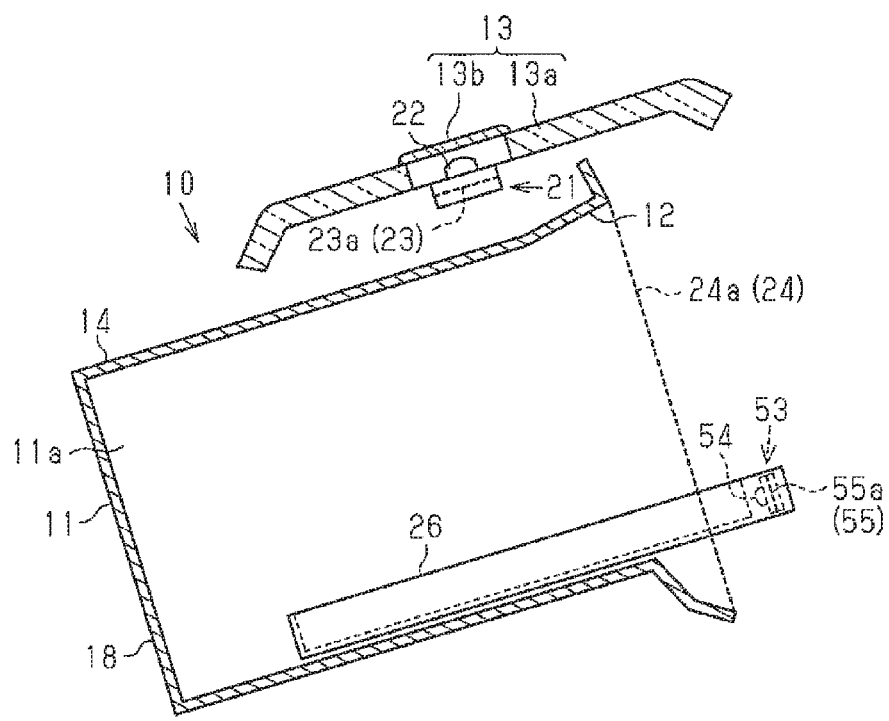
FIG. 26 is a cross-sectional view of the storage device of FIG. 23, illustrating a state in which the storage portion is open and the tray is slightly extracted.

FIGS. 25 and 26 illustrate a state in which the lid 13 is arranged above the top plate 14 to be substantially parallel with the top plate 14, and the opening 12 of the storage body 11 is open.

The distance between the supplying-side loop coil 24a and the receiving-side loop coil 23a is longer than the distance when the opening 12 is closed and also longer than the length at which power can be supplied from the power supplying portion 24 to the power receiving portion 23. Further, the central axis of the loop coil 24a and the central axis of the loop coil 23a are substantially perpendicular to each other, and the angle is substantially 90 degrees. The angle is greater than that when the opening 12 is closed and also greater than the angle at which power can be supplied from the power supplying portion 24 to the power receiving portion 23. Thus, no power is supplied to the power receiving portion 23 from the power supplying portion 24, so that the light emitter 22 stops emitting light. That is, the light emitter 22 is turned off.

As long as the tray 26 is entirely accommodated in the storage portion 11a, the supplying-side loop coil 24a and the receiving-side loop coil 55a are close to each other, and the distance in between is short. Thus, the power supply efficiency between the power receiving portion 55 and the power supplying portion 24 is maintained high.

The light emitter 54 emits light rearward. The emitted light illuminates the tray 26 and the surroundings. This allows user to see inside the storage portion 11a, such as small articles on the tray 26, through the opened opening 12.

When the opening 12 is opened, the tray 26 can be taken out of the storage portion 11a through the opening 12.

However, when the tray 26 is taken out of the storage portion 11a, the receiving-side loop coil 55a is separated away from the supplying-side loop coil 24a, and the distance in between is increased.

When the tray 26 is taken out of the storage portion 11a until the distance between the supplying-side loop coil 24a and the receiving-side loop coil 55a becomes the length at which power cannot be supplied from the power supplying portion 24 to the power receiving portion 55, the power receiving portion 55 stops being supplied with power from the power supplying portion 24.

However, until a predetermined period of time (for example, dozen seconds) elapses since power supply from the power supplying portion 24 to the power receiving portion 55 is stopped, the light emitter 54 continues emitting light with power stored in the capacitor 55b (refer to FIG.

14). The light emitted rearward from the light emitter 54 illuminates the tray 26 and the surroundings. Thus, even when the tray 26 is taken out of the storage portion 11*a*, the user can see small articles on the tray 26.

The storage device 10 of the eleventh embodiment has the following advantages.

(18) The storage device 10 includes the storage body 11 (the third storage body), which is a fixed body, and the lid 13, which is a movable body for opening and closing the opening 12 of the storage body 11. The lid 13 includes the optically transparent base member 13*a* and the ornamental member (the emblem 13*b*). The power supplying portion 24 is provided in the storage body 11, and the power receiving portion 23 and the light emitting portion (the light emitter 22) are provided in the lid 13. When the opening 12 is closed by the lid 13, the light emitting portion (the light emitter 22) emits light at a first luminance onto the base member 13*a* and the ornamental member (the emblem 13*b*). When the opening 12 is opened by the lid 13, the light emission is stopped. In other words, when the lid 13 opens the opening 12, the luminance of the light emitting portion (the light emitter 22) is changed to a second luminance, which is different from the first luminance at the time of closure of the opening 12 by the lid 13.

In conjunction with opening/closing operation of the lid 13, ambient lighting is performed to give an impression that the ornamental member (the emblem 13*b*) is floating, or that ambient lighting is stopped. This increases the effect of the ambient lighting.

(19) The storage device 10 includes the storage body 11 (the fourth storage body), which is a fixed body, and the tray 26, which is a movable body that can be put into and taken out from the storage body 11. The storage body 11 includes the opening 12, which is opened and closed by the lid 13. The power supplying portion 24 is provided in the storage body 11, and the power receiving portion 55 and the light emitting portion (the light emitter 54) are provided in the tray 26. When the tray 26 is accommodated in the storage portion 11*a*, the light emitting portion (the light emitter 54) emits light at the first luminance. As the tray 26 is taken out of the storage portion 11*a* through the opening 12, the distance between the power receiving portion 55 and the power supplying portion 24 is elongated, and the emission of light is eventually stopped. In other words, when the tray 26 is taken out of the storage portion 11*a* via the opening 12, the luminance of the light emitting portion (the light emitter 54) is changed to a second luminance, which is different from the first luminance at time of accommodation of the tray 26 in the storage body 11.

When the lid 13 is moved from a position for closing the opening 12 to a position for opening the opening 12, the tray 26 and the interior of the storage portion 11*a* are maintained at an illuminated state, readily allowing the user to visually check the tray 26 and the interior of the storage portion 11*a*. This allows articles to be easily taken out of or put into the storage portion 11*a*.

In conjunction with the extracting operation of the tray 26, ambient lighting is performed to illuminate the tray 26 and its surroundings, or that ambient lighting is stopped. This increases the effect of the ambient lighting.

(20) Since the lid 13, which is a movable body, is moved relative to the storage body 11 (the third storage body, the fourth storage body), which is a fixed body, it is difficult to supply power to the light emitter 22 through wires. Also, since the tray 26, which is a movable body, is moved relative to the storage body 11, which is a fixed body, it is difficult to supply power to the light emitter 54 through wires.

In this regard, in the storage device 10, the power receiving portion 23 in the lid 13 and the power receiving portion 55 in the tray 26 are supplied with power from the power supplying portion 24 in the storage body 11 through wireless power supply.

This eliminates the necessity for wired connection between the power source and the light emitter 22 and wired connection between the power source and the light emitter 54. Thus, unlike the case of wired connection, problems such as breakage of wires do not occur.

Particularly, the wireless power supply is employed in the tray 26. Thus, unlike the case of wired connection, the movement distance is not limited by the length of the power code. The tray 26 therefore can be moved freely without limit in relation to the storage body 11.

The power supply to the power receiving portion 23 in the lid 13 and the power supply to the power receiving portion 55 in the tray 26 are performed by the common power supplying portion 24. Compared to a case in which the power supply to the power receiving portion 23 and the power supply to the power receiving portion 55 are performed by separate power supplying portions, the number of components can be reduced.

Figure 14:
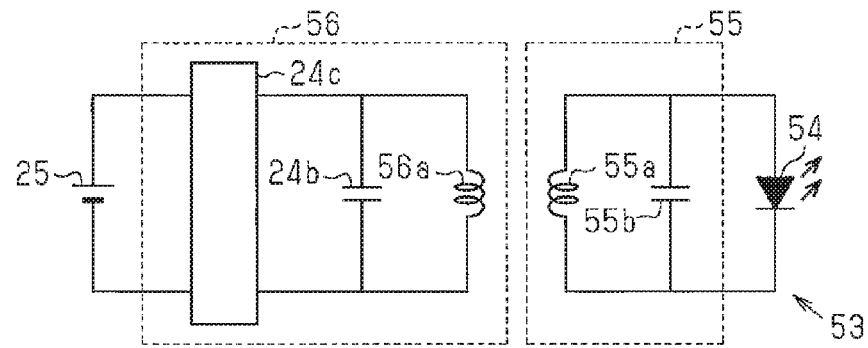
FIG. 14 is a circuit diagram of a wireless power supply system of a direct current resonance method used in the holder device of FIG. 12.

(21) In the second resonance circuit on the power receiving side in the power receiving portion 55, the capacitor 55*b* is connected in parallel with the light emitter 54 (FIG. 14). The capacitor 55*b* also functions as a power storing portion that stores some of the power received by the loop coil 55*a*.

Thus, the light emitter 54 can continue to emit light for a certain period of time even when the tray 26, which is a movable body, is extracted from the storage body 11, that is, even when the power receiving portion 55 is moved to a position where power supply from the power supplying portion 24 to the power receiving portion 55 cannot be performed.

The tray 26 and the positions of small articles on the tray 26 can be visually checked. The hand holding the tray 26 is illuminated, which allows the tray 26 to be easily moved. Further, the tray 26 can be easily put back into the storage portion 11*a* of the storage body 11 through the opening 12.

(22) The direct current resonance method is used in the wireless power supply system.

Thus, as in the above described item (3), the power supply efficiency is higher than the electromagnetic induction method. Thus, the arrangement of the supplying-side loop coil 24*a* and the receiving-side loop coils 23*a*, 55*a* can be highly flexibly determined.

The storage device 10 of the eleventh embodiment may be modified as follows.

The emblem 13*b* may be replaced by another ornamental member on condition that such an ornamental member decorates the lid 13.

The ornamental member (the emblem 13*b*) may be formed by an optically transparent material.

When the lid 13 is pivoted between the position for closing the opening 12 and the position for opening the opening 12, the distance and the angle between the power receiving portion 23 and the power supplying portion 24 are gradually changed as the lid 13 is pivoted. This gradually changes the power supply efficiency between the power receiving portion 23 and the power supplying portion 24. Through the use of such changes in the power supply efficiency, the luminance of the light emitter 22 may be gradually changed in accordance with pivoting motion of the lid 13.

When the tray 26 is extracted from the storage portion 11*a*, the distance between the power receiving portion 55 and the power supplying portion 24 is gradually changed as the tray 26 is moved. This gradually changes the power supply efficiency between the power receiving portion 55 and the power supplying portion 24. Through the use of such changes in the power supply efficiency, the luminance of the light emitter 54 may be gradually changed in accordance with extracting motion of the tray 26.

For the same reasons presented in the first embodiment, the receiving-side loop coil 23a and the light emitter 22 in the light emitting unit 21 may be incorporated in different units, and the units may be arranged at positions that are spaced apart from each other. The light emitter 22 may be located at any position in the lid 13 if the wires from the first resonance circuit on the power receiving side are extended.

The receiving-side loop coil 55a and the light emitter 54 in the light emitting unit 53 may be incorporated in different units, and the units may be arranged at positions that are spaced apart from each other.

Twelfth Embodiment

A holder device 120, which is a light emitting interior product according to the twelfth embodiment, will now be described with reference to FIGS. 27 to 32.

Figure 27:
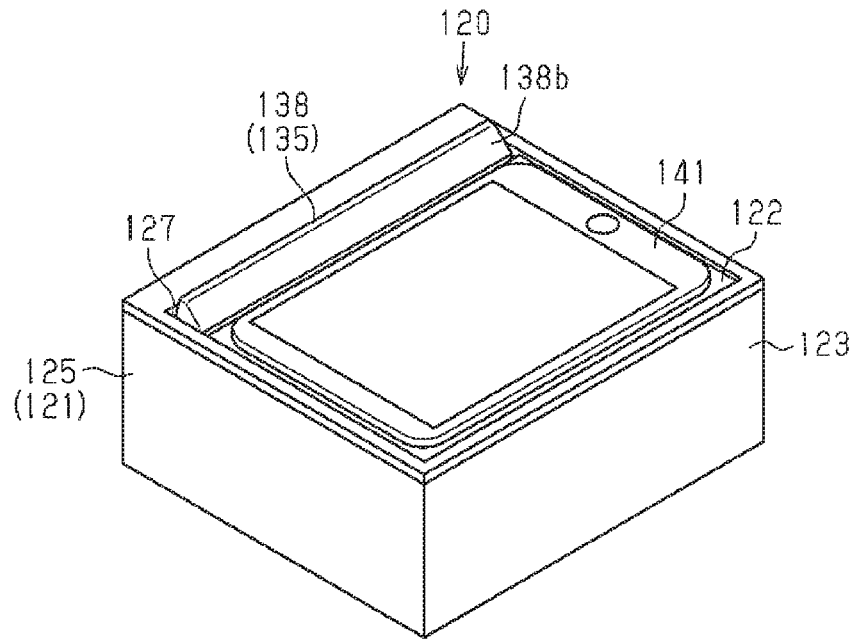
FIG. 27 is a perspective view of a holder device, which is a light emitting interior product according to a twelfth embodiment, illustrating a state in which a movable holding member is locked at a retracted position.
Figure 28:
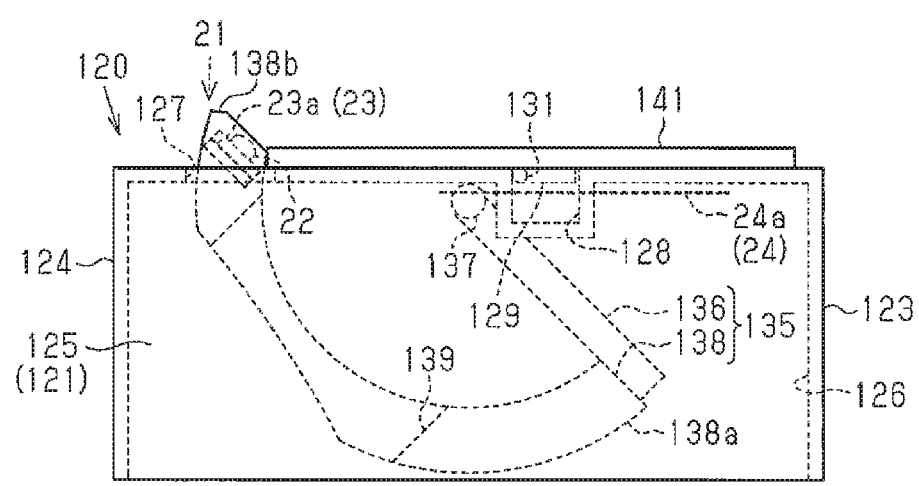
FIG. 28 is a side view of the holder device of FIG. 27, illustrating a state in which the movable holding member is locked at the retracted position.

As shown in FIGS. 27 to 28, the holder device 120 includes a case 121, which is a fixed body, and a movable holding member 135, which is a movable body.

The case 121 has a rectangular plate-like placement portion 122 and four wall portions, which extend downward from the four sides of the placement portion 122. Different types of second objects 141 to 143 are placed on the placement portion 122. When placed on the placement portion 122, the second objects 141 to 143 have different postures.

To identify each section of the case 121, the lateral direction in FIG. 28 is defined as a front-rear direction, and a direction perpendicular to the sheet of FIG. 28 is defined as a width direction. To distinguish the four wall portions of the case 121, one of the two wall portions on the opposite ends in the front-rear direction is defined as a front wall portion 123, and the other one is defined as a rear wall portion 124. The two wall portions on the opposite ends in the width direction are defined as side wall portions 125.

A space in the case 121 that is surrounded by the placement portion 122, the front wall portion 123, the rear wall portion 124, and the two side wall portions 125 constitutes a housing portion 126.

The placement portion 122 has a slit 127, which extends in the width direction, at a position close to the rear wall portion 124. The opposite ends of the slit 127 in the width direction are each located close to the corresponding side wall portion 125. Through the slit 127, the housing portion 126 communicates with the exterior of the case 121.

The placement portion 122 has a recess 128, which extends in the width direction, at a position spaced forward (rightward as viewed in FIG. 28) from the slit 127. The measurement in the width direction of the recess 128 is smaller than the measurement in the width direction of the slit 127. Accordingly, the distance between each end in the width direction of the recess 128 and the closer one of the side wall portions 125 is greater than the distance between each end in the width direction of the slit 127 and the closer one of the side wall portions 125.

A lid 129 is placed at an upper portion of the recess 128. The lid 129 has pivots 131 located at opposite ends in the width direction in a rear portion (a left portion as viewed in FIG. 28). The lid 129 is supported by the inner wall portions of the recess 128 with the pivots 131, so that the lid 129 can be inclined between a closed position for closing the recess 128 (refer to FIG. 28) and an open position for opening the recess 128. At the open position, the lid 129 is tilted such that the front end is lowered.

The movable holding member 135 includes a pair of arms 136 and a holding main body 138. The arms 136 have an elongated shape and spaced apart from each other in the width direction in the housing portion 126. More specifically, each arm 136 is located between the corresponding one of the side wall portions 125 and the recess 128. Each arm 136 has a shaft portion 137 at a first end. Each arm 136 is supported to be inclined about the shaft portion 137 substantially at the center in the front-rear direction in an upper portion of the corresponding side wall portion 125.

The holding main body 138 has an arched shape that is formed by cutting out, along the axis, a part of a cylinder extending in the width direction. As viewed from the side, the holding main body 138 has an arcuate shape that extends along a circle that has the shaft portion 137 of each arm 136 as the center and the distance between the shaft portion 137 and the slit 127 as the radius. The holding main body 138 is inserted in the slit 127 to be movable along its own circumference.

The holding main body 138 includes a first end 138a and a second end 138b in the circumferential direction of the holding main body 138. At two positions in the first end 138a that are close to the side wall portions 125, the holding main body 138 is coupled to second ends of the arms 136, which are ends opposite to the first ends, at which the shaft portions 137 are located. The second end 138b of the holding main body 138 is always exposed to the exterior of the case 121 (the part above the placement portion 122). As the arms 136 are inclined about the shaft portions 137, the holding main body 138 pivots about the shaft portions 137.

The holding main body 138 has two holding holes 139, which extend through the holding main body 138 in the thickness direction. In the twelfth embodiment, the two holding holes 139 are arranged side by side in the width direction (refer to FIG. 31). When second objects 143 such as beverage containers placed on the placement portion 122 of the case 121 are held in an upright state, the second objects 143 are passed through the holding holes 139.

The holder device 120 has a locking mechanism (not shown) for locking the movable holding member 135, which pivots about the shaft portions 137, at three positions, or a retracted position, an intermediate position, and a projected position.

The retracted position corresponds to a position at which most of the holding main body 138 is housed in the housing portion 126 of the case 121 as shown in FIGS. 27 and 28. At the retracted position, only the second end 138b of the holding main body 138 is exposed to the exterior of the case 121, that is, to be located above the placement portion 122. The arms 136 are inclined such that the parts forward of the shaft portion 137 are located at lower positions.

Figure 29:
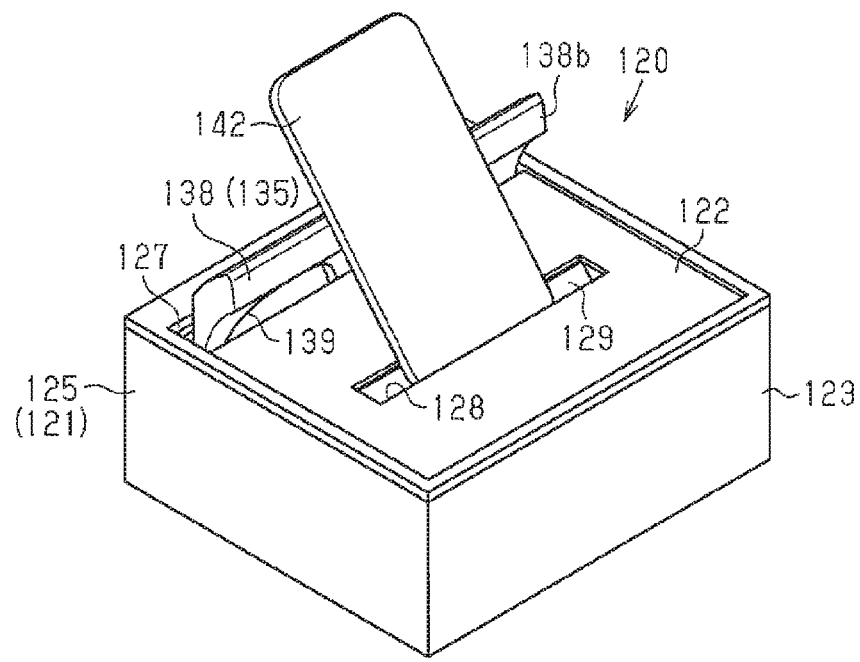
FIG. 29 is a perspective view of the holder device of FIG. 27, illustrating a state in which the movable holding member is locked at an intermediate position.
Figure 30:
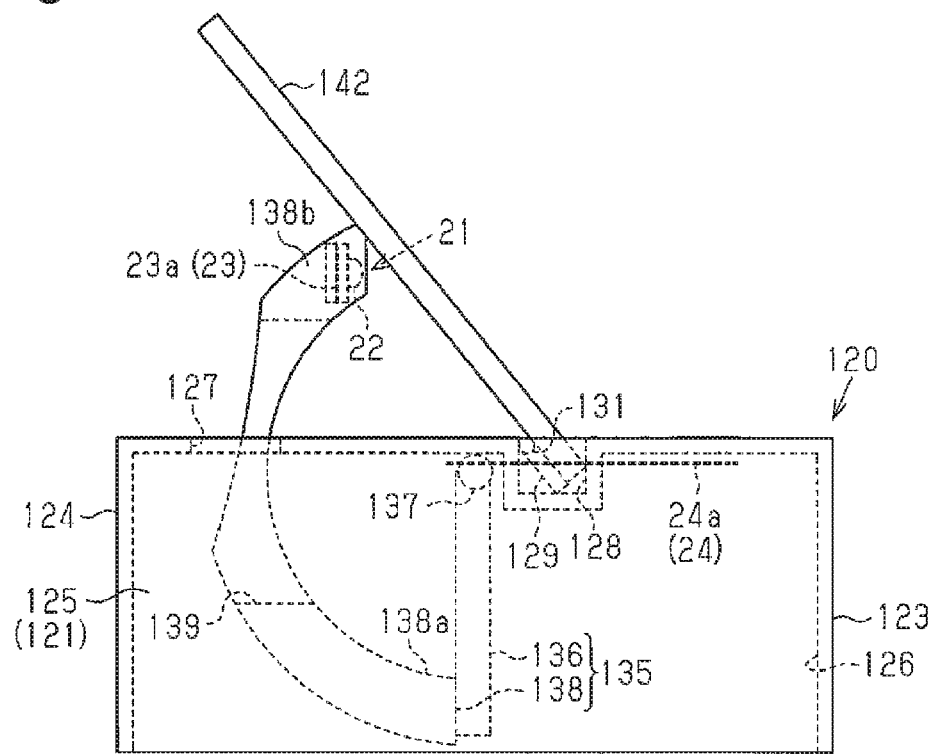
FIG. 30 is a side view of the holder device of FIG. 27, illustrating a state in which the movable holding member is locked at the intermediate position.

As shown in FIGS. 29 and 30, the intermediate position corresponds a position at which a part of the holding main body 138 that includes the first end 138a is housed in the housing portion 126 of the case 121, the remaining part, which includes the second end 138b is exposed from the case 121. The arms 136 are in vertical states at the intermediate position.

Figure 31:
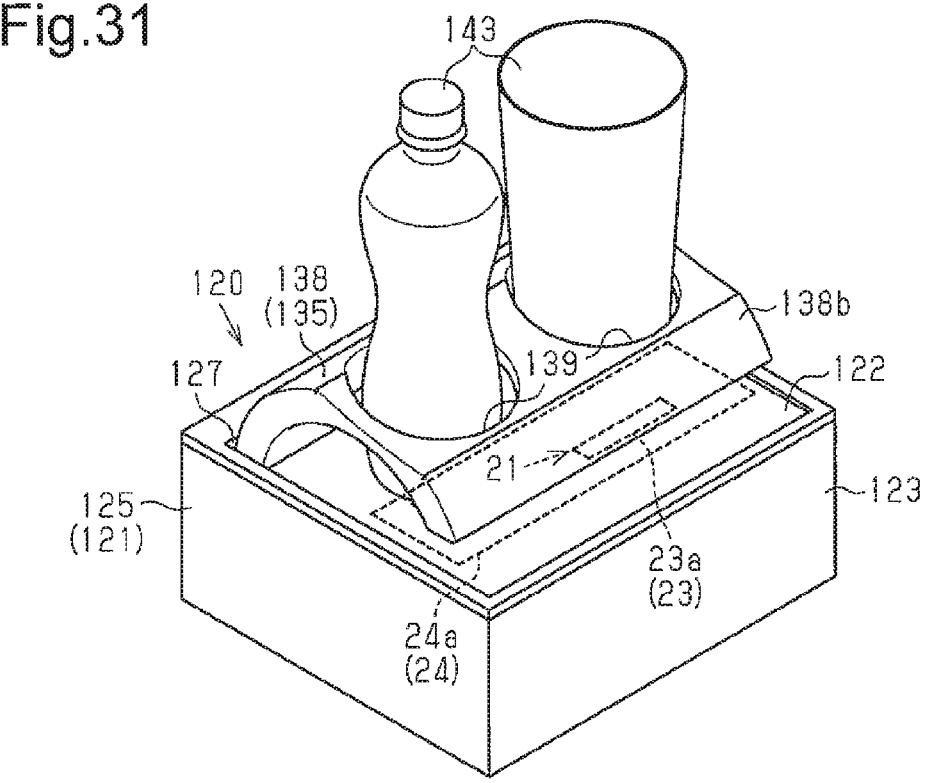
FIG. 31 is a perspective view of the holder device of FIG. 27, illustrating a state in which the movable holding member is locked at a projected position.
Figure 32:
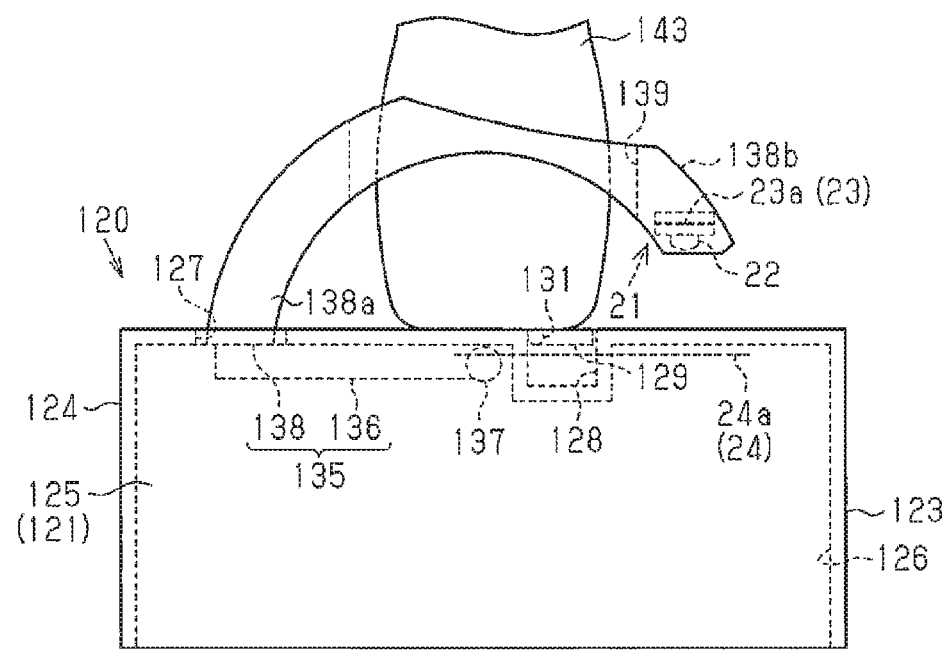
FIG. 32 is a side view of the holder device of FIG. 27, illustrating a state in which the movable holding member is locked at the projected position.

The projected position corresponds to a position at which most of the holding main body 138 is exposed from the case 121 as shown in FIGS. 31 and 32. The arms 136 are substantially horizontal in the housing portion 126. The central axes of the holding holes 139 in the holding main body 138 are substantially vertical.

A light emitting unit 21, which has the same structure as that in the first embodiment, is provided at the second end 138*b* of the holding main body 138. That is, the light emitting unit 21 includes a light emitter 22 such as an LED or an EL device and a power receiving portion 23 for wireless power supply. Thus, the movable holding member 135 corresponds to a first component. The loop coil 23*a* in the power receiving portion 23 constitutes a part of a first resonance circuit on the power receiving side (refer to FIG. 6). The light emitter 22 emits light to illuminate the surroundings of the second end 138*b* of the holding main body 138.

An upper part of the case 121, that is, the lower surface of the placement portion 122, has a power supplying portion 24, which performs wireless power supply to the light emitting unit 21. Thus, the case 121 corresponds to a second component. The power supplying portion 24 has the same structure as that of the first embodiment. The loop coil 24*a* in the power supplying portion 24 constitutes a part of a second resonance circuit on the power supplying side (refer to FIG. 6). The loop coil 24*a* is located at a position that is closest to the light emitting unit 21 of the movable holding member 135 locked at the projected position. The power supplying portion 24 uses, as a power source, the vehicle battery 25, which is a direct-current power source, and supplies the power to the power receiving portion 23 by the direct current resonance method.

The holder device 120 of the twelfth embodiment is constructed as described above. Operation of the holder device 120 will now be described.

As shown in FIGS. 27 and 28, when the movable holding member 135 is locked at the retracted position, only the second end 138*b* of the holding main body 138 is exposed above the placement portion 122. The lid 129 is at the closed position to close the recess 128.

At this time, the movable holding member 135 is not present above the placement portion 122 or forward of the slit 127. Thus, a second object 141, which is, for example, a tablet computer, can be placed on the placement portion 122. The second end 138*b* of the movable holding member 135, which is exposed from the placement portion 122, functions as a stopper that contacts the second object 141 to restrict the second object 141 from moving further rearward than the second end 138*b*.

The distance between the supplying-side loop coil 24*a* and the receiving-side loop coil 23*a* is longer than the distance when the movable holding member 135 is locked at the projected position (refer to FIGS. 31 and 32) and longer than the length at which power can be supplied from the power supplying portion 24 to the power receiving portion 23. Further, the angle between the central axis of the loop coil 24*a* and the central axis of the loop coil 23*a* is greater than that when the movable holding member 135 is locked at the projected position (refer to FIGS. 31 and 32) and greater than the angle at which power can be supplied from the power supplying portion 24 to the power receiving portion 23. Thus, no power is supplied to the power receiving portion 23 from the power supplying portion 24, so that the light emitter 22 does not emit light.

As shown in FIGS. 29 and 30, when the movable holding member 135 is locked at the intermediate position, a part of the holding main body 138 that includes the second end 138*b* is exposed from the case 121.

At this time, the second end 138*b* of the holding main body 138 is above and rearward of the recess 128. Thus, the lower end of a flat plate-like second object 142, such as a smartphone or a feature phone, can be inserted into the recess 128, and the second object 142 is allowed to lean against the second end 138*b* of the holding main body 138. At this time, the lid 129 receives the weight of the second object 142 and is inclined to the open position to open the recess 128. This allows the second object 142 to be inserted into the recess 128. With the lower end of the second object 142 inserted into the recess 128 and the second object 142 leaning against the second end 138*b* of the holding main body 138, the second object 142 is held in an inclined posture by the placement portion 122.

At this time, the distance between the supplying-side loop coil 24*a* and the receiving-side loop coil 23*a* is still longer than the length at which power can be supplied from the power supplying portion 24 to the power receiving portion 23. Further, the angle between the central axis of the loop coil 24*a* and the central axis of the loop coil 23*a* is still greater than the angle at which power can be supplied from the power supplying portion 24 to the power receiving portion 23. Thus, no power is supplied to the power receiving portion 23 from the power supplying portion 24, so that the light emitter 22 does not emit light.

As shown in FIGS. 31 and 32, when the movable holding member 135 is locked at the projected position, most of the holding main body 138 is exposed from the case 121.

At this time, the holding holes 139 of the holding main body 138 are located at positions spaced upward from the placement portion 122, and the central axes of the holding holes 139 are substantially vertical. Thus, the second objects 143, which are beverage containers such as plastic bottles and cups, can be inserted into the holding holes 139 from above to be placed on the placement portion 122. The inner wall of the holding hole 139 restricts the second object 143 from shifting in the front-rear direction or the width direction. The second objects 143 are held in upright states on the placement portion 122.

At this time, the lid 129 is horizontal. That is, the recess 128 is closed by the lid 129.

At the projected position, the receiving-side loop coil 23*a* is close to the supplying-side loop coil 24*a*, and the distance between the loop coils 23*a*, 24*a* is shortened. Also, the central axis of the loop coil 24*a* and the central axis of the loop coil 23*a* are substantially parallel with each other and the angle between the loop coils 23*a*, 24*a* is substantially 0 degrees. Thus, the power supply efficiency between the power receiving portion 23 and the power supplying portion 24 is high.

The light emitter 22 emits light. The emitted light illuminates the second end 138*b* of the holding main body 138 and the area around it. Some of the light illuminates the second object 143 held in an upright state. This readily allows the user to visually check the illuminated second end 138*b* of the holding main body 138 and the second object 143.

The holder device 120 of the twelfth embodiment achieves the following advantages in addition to the advantage of item (3) presented above.

(23) The holder device 120 of the twelfth embodiment includes the case 121, which is a fixed body, and the movable holding member 135, which is a movable body. The case 121 has the placement portion 122, on which different types of second objects 141 to 143 are placed. When placed on the placement portion 122, the second objects 141 to 143 have different postures. The movable holding member 135 is extracted from or retracted into the placement portion 122 of the case 121, so that the second object 142 placed on the placement portion 122 is held by the movable holding member 135 in a posture suitable for the second object 142. Also, the second object 143 placed on the placement portion 122 is held by the movable holding member 135 in a posture suitable for the second object 143. When the movable holding member 135 is at the projected position, at which the movable holding member 135 is projected from the placement portion 122 of the case 121 by the greatest amount, the light emitting portion (the light emitter 22) emits light at the first luminance. When the movable holding member 135 is at the retracted position (refer to FIGS. 27 and 28) or the intermediate position (refer to FIGS. 29 and 30), the light emitting portion (the light emitter 22) stops emitting light. That is, by retracting the movable holding member 135 at the projected position into the case 121, the distance and the angle between the power receiving portion 23 and the power supplying portion 24 are changed. This changes the luminance of the light emitting portion (the light emitter 22) to a second luminance, which is different from the first luminance at the time of projecting of the movable holding member 135.

In this manner, in conjunction with projecting/retracting operation of the movable holding member 135 relative to the case 121, ambient lighting is performed to illuminate the second end 138b of the movable holding member 135 or the second objects 143 (beverage containers), or that ambient lighting is stopped. This increases the effect of the ambient lighting.

(24) When the movable holding member 135 is arranged at the retracted position (refer to FIGS. 27 and 28), most of the movable holding member 135 is housed in the housing portion 126 of the case 121.

Thus, a large space exists above the case 121, and the second object 141 such as a tablet computer can be placed on the placement portion 122 in a stable manner.

(25) When the movable holding member 135 is arranged at the retracted position (refer to FIGS. 27 and 28), the holding main body 138 is exposed from the case 121 only at the second end 138b.

The movable holding member 135 thus restricts the second object 141 such as a tablet computer placed on the placement portion 122 from being moved excessively rearward.

(26) The placement portion 122 of the case 121 has the recess 128, which extends in the width direction. When the movable holding member 135 is arranged at the intermediate position (refer to FIGS. 29 and 30), the second end 138b of the holding main body 138 is located behind and above the recess 128.

Thus, by inserting the lower end of the second object 142 such as a smart phone or a feature phone into the recess 128 and causing the second object 142 to lean against the second end 138b of the holding main body 138, the second object 142 is held in an inclined state relative to the placement portion 122.

(27) When the movable holding member 135 is arranged at the projected position (refer to FIGS. 31 and 32), the holding holes 139 are located above the placement portion 122. The movable holding member 135 is arranged such that the central axes of the holding holes 139 are vertical.

Thus, by placing the second objects 143 such as beverage containers on the placement portion 122 in a state inserted in the holding holes 139, the second objects 143 can be held in an upright state.

(28) Since the movable holding member 135, which is a movable body, is moved relative to the case 121, which is a fixed body, it is difficult to supply power to the light emitter 22 through wires.

In this respect, in the holder device 120, the power receiving portion 23 in the movable holding member 135 is supplied with power from the power supplying portion 24 in the placement portion 122 of the case 121 through wireless power supply.

This eliminates the necessity for wired connection between the power source and the light emitter 22. Thus, unlike the case of wired connection, problems such as breakage of wires do not occur.

The holder device 120 of the twelfth embodiment may be modified as follows.

When the movable holding member 135 is extracted from or retracted into the case 121, the distance and the angle between the power receiving portion 23 and the power supplying portion 24 are gradually changed, accordingly. This gradually changes the power supply efficiency. Through the use of such changes in the power supply efficiency between the power receiving portion 23 and the power supplying portion 24, the luminance of the light emitter 22 may be gradually changed in accordance with extracting/retracting motion of the movable holding member 135.

The receiving-side loop coil 23a and the light emitter 22 do not need to be incorporated in a single unit. The receiving-side loop coil 23a and the light emitter 22 may be incorporated in different units, and the units may be arranged at positions that are spaced apart from each other. The light emitter 22 may be located at any suitable position in the movable holding member 135 by extending the wires from the first resonance circuit on the power receiving side.

Thirteenth Embodiment

A storage device 150, which is a light emitting interior product according to the thirteenth embodiment, will now be described with reference to FIGS. 33 and 34.

The storage device 150 includes a console box 151, which is a fixed body, and various types of third objects 155, each of which is a movable body.

Figure 33:
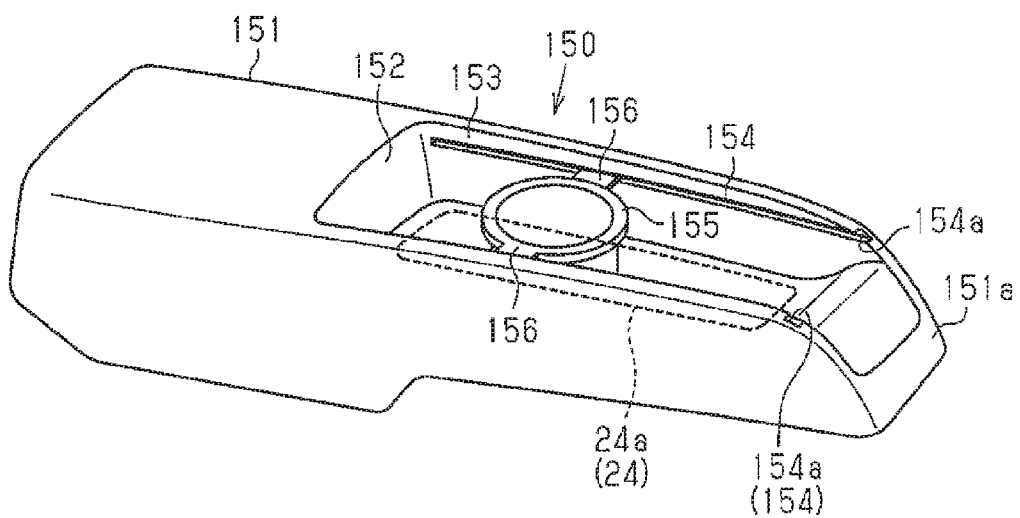
FIG. 33 is a perspective view of a storage device, which is a light emitting interior product according to a thirteenth embodiment.
Figure 34:
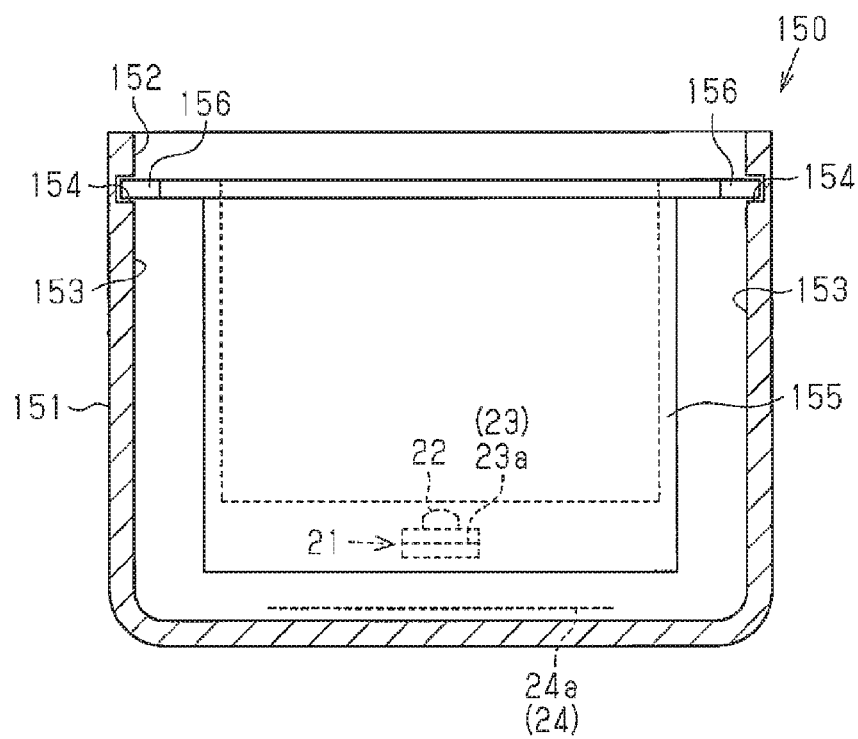
FIG. 34 is a cross-sectional view of the storage device of FIG. 33.

The console box 151 has an elongated shape in the front-rear direction (substantially the lateral direction as viewed in FIG. 33, and the direction perpendicular to the sheet of FIG. 34). A part in the longitudinal direction of the console box 151 is formed as a storage portion 152. The storage portion 152 is a recess with an open upper end. The storage portion 152 is also elongated in the front-rear direction. The storage portion 152 accommodates the third objects 155.

The storage portion 152 has two side wall surfaces 153, which face each other in the width direction (the lateral direction as viewed in FIG. 34). Each side wall surface 153 has a guide groove 154 in an upper portion. The guide groove 154 functions as a guide portion that extends linearly in the front-rear direction. The front end (the right end as viewed in FIG. 33) of each guide groove 154 reaches the front surface 151a of the console box 151.

The third objects 155 include, for example, a cup holder, an ashtray, and a portable phone holder. Each third object 155 has guide projections 156, which are guided portions, at the upper end of the outer circumferential surface. The guide projections 156 are located on opposite sides of the central axis of the third object 155. The guide projections 156 are engaged with the guide grooves 154 such that the guide projections 156 can be slid in the front-rear direction. Each guide groove 154 has an opening 154a at the front end. The guide projections 156 can be removed from or attached to the guide grooves 154 via the openings 154a. Thus, the third object 155 accommodated in the storage portion 152 can be replaced by removing the guide projections 156 from the guide grooves 154 via the openings 154a and then engaging the guide projections 156 of another third object 155 with the guide grooves 154 via the openings 154a.

The console box 151 has a movable stopper (not shown) at the front portion. When not operated, the movable stopper is located in the front parts of the guide grooves 154 to restrict the guide projections 156 engaged with the guide grooves 154 from moving forward of the movable stopper. When operated, the movable stopper is separated from the guide grooves 154 to allow the guide projections 156 engaged with the guide grooves 154 to move forward.

A light emitting unit 21, which has the same structure as that in the first embodiment, is provided at the bottom portion of each third object 155. That is, as shown in FIGS. 6 and 34, the light emitting unit 21 includes a light emitter 22 such as an LED or an EL device and a power receiving portion 23 for wireless power supply. Thus, each third object corresponds to a first component. The loop coil 23a in the power receiving portion 23 constitutes a part of a first resonance circuit on the power receiving side. The light emitter 22 emits light to illuminate at least the bottom portion of the third object 155.

A power supplying portion 24 for wirelessly supplying power to the light emitting unit 21 is provided at the bottom portion of the console box 151 and in a lower part of the storage portion 152. Thus, the console box 151 corresponds to a second component. The power supplying portion 24 has the same structure as that described in the first embodiment. That is, the loop coil 24a constitutes a part of a second resonance circuit on the power supplying side in the power supplying portion 24 and is provided over the entire length in the front-rear direction of the storage portion 152. The power supplying portion 24 uses, as a power source, the vehicle battery 25, which is a direct-current power source, and supplies the power to the power receiving portion 23 by the direct current resonance method.

The storage device 150 of the thirteenth embodiment is constructed as described above. Operation of the storage device 150 will now be described.

When one of the third objects 155 is accommodated in the storage portion 152 of the console box 151, and the guide projections 156 are engaged with the guide grooves 154, the receiving-side loop coil 23a is located close to the supplying-side loop coil 24a. Thus, the distance between the loop coils 23a, 24a is short, and the power supply efficiency between the power receiving portion 23 and the power supplying portion 24 is increased.

The light emitter 22 emits light. The emitted light illuminates at least the bottom portion of the third object 155. For example, when the third object 155 is a cup holder and a cup is held upright by the cup holder, at least the bottom portion of the cup is illuminated.

The position in the front-rear direction of the third object 155 in the storage portion 152 can be adjusted by sliding the guide projections 156 along the guide grooves 154 in the front-rear direction. Thus, the third object 155 can be placed at any preferred position in the front-rear direction. Even after the position is adjusted, the receiving-side loop coil 23a is close to the supplying-side loop coil 24a, and the distance between the loop coils 23a, 24a is shortened. Thus, light emitted by the light emitter 22 illuminates at least the bottom portion of the third object 155.

When changing the type of the third object 155 accommodated in the storage portion 152, the guide projections 156 are moved forward along the guide grooves 154. The movable stopper is operated to be separated from the guide grooves 154, and the third object 155 is moved forward to detach the guide projections 156 from the guide grooves 154.

Then, the distance between the supplying-side loop coil 24a and the receiving-side loop coil 23a becomes longer than that when the guide projections 156 are engaged with the guide grooves 154, and the third object 155 is accommodated in the storage portion 152. The distance between the loop coil 24a and the loop coil 23a becomes longer than the length at which power can be supplied from the power supplying portion 24 to the power receiving portion 23. Thus, no power is supplied to the power receiving portion 23 from the power supplying portion 24, so that the light emitter 22 does not emit light.

Further, the guide projections 156 of a third object 155 that is different from the removed third object 155 are engaged with the guide grooves 154. The guide projections 156 of the third object 155 are slid rearward along the guide grooves 154, and the movable stopper is operated to be moved to the guide grooves 154. As, the third object 155 is slid, the receiving-side loop coil 23a is brought closer to the supplying-side loop coil 24a, and the distance between the loop coils 23a, 24a is shortened. This causes the light emitter 22 to emit light.

The storage device 150 of the thirteenth embodiment achieves the following advantages in addition to the advantage of item (3) presented above.

(29) The storage device 150 of the thirteenth embodiment includes the console box 151, which is a fixed body, and various types of the third objects 155, each of which is a movable body. Each third object 155 has guide projections 156, which are guided portions, at the upper part of the outer surface. The console box 151 has the storage portion 152, which has an open upper end and accommodates the third objects 155. Each side wall surface 153 of the storage portion 152 has a guide groove 154 in an upper portion. The guide groove 154 functions as a guide portion that extends linearly in the front-rear direction. The guide grooves 154 detachably receive the guide projections 156 of the third objects 155. The power supplying portion 24 is provide in a lower part of the storage portion 152 of the console box 151, and the power receiving portion 23 and the light emitting portion (the light emitter 22) are provided on the bottom portion of each third object 155.

Thus, when one of the third objects 155 is in the storage portion 152, the light emitter 22 emits light, which illuminates at least the bottom portion of the third object 155.

When the guide projections 156 are removed from the guide grooves 154, and the third object 155 is located outside the storage portion 152, the light emitter 22 stops emitting light.

In this manner, in conjunction with sliding motion of the third object 155 along the guide grooves 154, ambient lighting is performed to illuminate at least the bottom portion of the third object 155, or that ambient lighting is stopped. This increases the effect of the ambient lighting.

The position in the front-rear direction of the third object 155 can be changed in accordance with user preference. With the guide projections 156 engaged with the guide grooves 154, at least the bottom portion of the third object 155 is illuminated by the light emitter 22 regardless of the position in the front-rear direction of the third object 155.

The third object 155 accommodated in the storage portion 152 can be replaced by removing the guide projections 156 from the guide grooves 154 and then engaging the guide projections 156 of another third object 155 with the guide grooves 154.

(30) Since the third object 155, which is a movable body, is moved relative to the console box 151, which is a fixed body, it is difficult to supply power to the light emitter 22 through wires.

In this respect, in the storage device 150, the power receiving portion 23 in the third object 155 is supplied with power from the power supplying portion 24 in the bottom portion of the console box 151 through wireless power supply.

This eliminates the necessity for wired connection between the power source and the light emitter 22. Unlike the case of wired connection, problems such as breakage of wires do not occur.

Particularly, the wireless power supply is employed in the third object 155. Thus, unlike the case of wired connection, the movement distance is not limited by the length of the power code. The third object 155 therefore can be moved freely without limit in relation to the console box 151.

The storage device 150 of the thirteenth embodiment may be modified as follows.

In the thirteenth embodiment, the loop coil 24a of the power supplying portion 24 is arranged substantially over the entire length in the front-rear direction of the storage portion 152. However, the loop coil 24a may be provided only in a part in the front-rear direction, for example, in an intermediate part. In this case, the distance between the power receiving portion 23 and the power supplying portion 24 is gradually changed as the third object 155 is slid in the front-rear direction in the storage portion 152. This gradually changes the power supply efficiency between the power supplying portion 24 and the power receiving portion 23. Through the use of such changes in the power supply efficiency, the luminance of the light emitter 22 may be gradually changed in accordance with sliding motion of the third object 155.

The loop coil 24a of the power supplying portion 24 may be located close to the wall surface 153 of the storage portion 152 in the console box 151. In this case, the loop coil 23a of the light emitting unit 21 is preferably located in the side of the third object 155.

The receiving-side loop coil 23a and the light emitter 22 do not need to be incorporated in a single unit. The receiving-side loop coil 23a and the light emitter 22 may be incorporated in different units, and the units may be arranged at positions that are spaced apart from each other. The light emitter 22 can be located at any position in the third object 155 if the wires from the first resonance circuit on the power receiving side are extended.

As in the third embodiment, the first resonance circuit on the power receiving side in the power receiving portion 23 of each third object 155 may have a capacitor connected in parallel with the light emitter 22. The capacitor may function as a power storing portion that stores some of the power received by the loop coil 23a.

In this configuration, when the third object 155 is removed from the console box 151, and power supply from the power supplying portion 24 to the power receiving portion 23 is stopped, the light emitter 22 continues emitting light with power stored in the capacitor 55b until a certain period of time elapses. Thus, at least the bottom portion of the third object 155 can be illuminated by the light emitted by the light emitter 22.

In contrast to the thirteenth embodiment, a guide projection serving as a guide portion, which extend in the front-rear direction, may be provided on the wall surface of the storage portion 152, and a guide groove, which functions as a guided portion, may be formed in the third object 155. That is, the guide grooves of the third object 155 may be engaged with the guide projections of the storage portion 152.

The guide portions may extend in any direction other than the front-rear direction as long as they extend linearly.

Other Modifications

Other than the first to thirteenth embodiments, the present invention may be embodied in the following forms.

In the direct current resonance method, two or more power receiving portions may be provided to correspond to a single power supplying portion. A single power receiving portion may be provided to correspond to two or more power supplying portions. Two or more power receiving portions may be provided to correspond to two or more power supplying portions.

In addition to changing the luminance, the light emitters may be configured to blink.

The light emitting interior products may be used as interior products other than the above illustrated vehicle interior products. The light emitting interior products may be used as various types of interior products such as those used in buildings or aircrafts.

The invention claimed is:

1. A light emitting interior product comprising:
a first component;
a second component;
a light emitting portion provided in the first component;
a power receiving portion, which is provided in the first component and connected to the light emitting portion; and
a power supplying portion, which is provided in the second component and configured to supply power to the power receiving portion by a direct current resonance method, wherein
one of the first component and the second component is a fixed body, which is held in a stopped state,
the other one of the first component and the second component is a movable body, which is moved relative to the fixed body,
the power supplying portion and the power receiving portion are arranged such that, when the movable body is moved relative to the fixed body, one of a distance and an angle between the power supplying portion and the power receiving portion changes, and the light emitting portion changes a manner of light emission in accordance with the change.

2. The light emitting interior product according to claim 1, wherein
the first component is the fixed body and is a first storage body having an opening,
the second component is the movable body and is a lid, which selectively opens and closes the opening of the first storage body,
the power supplying portion is provided in the lid,
the power receiving portion and the light emitting portion are provided in the first storage body, the light emitting portion emits light to interior of the first storage body at a first luminance when the opening is closed by the lid, and when the lid opens the opening so that one of the distance and the angle between the power receiving portion and the power supplying portion is changed, the light emitting portion changes the luminance to a second luminance, which is different from the first luminance.

3. The light emitting interior product according to claim 1, wherein the first component is the movable body and is a second storage body for storing articles, the second component is the fixed body and is a housing portion, which houses the second storage body, the power supplying portion is provided in the housing portion, the power receiving portion and the light emitting portion are provided in the second storage body, the light emitting portion emits light to interior of the second storage body at a first luminance when the second storage body is housed in the housing portion, and when the second storage body is extracted from the housing portion so that one of the distance and the angle between the power receiving portion and the power supplying portion is changed, the light emitting portion changes the luminance to a second luminance, which is different from the first luminance.

4. The light emitting interior product according to claim 1, wherein the first component is the movable body and is a first object, which is a cylinder with a closed end, the second component is the movable body and is a storage holder, which stores the first object, the power supplying portion is provided in the storage holder, the power receiving portion and the light emitting portion are provided in the first object, and when the first object is moved relative to the storage holder so that one of the distance and the angle between the power receiving portion and the power supplying portion is changed, the light emitting portion changes a luminance.

5. The light emitting interior product according to claim 1, wherein the first component is the movable body and is a manipulation portion for manipulating a louver, which is located at a vent for conditioned air in an air conditioner and adjusts at least one of a flow direction and a flow rate of the conditioned air, the second component is the fixed body and is a bezel provided about the vent, the power supplying portion is provided in the bezel, the power receiving portion and the light emitting portion are provided in the manipulation portion, and when the manipulation portion is moved so that relative positions of the power receiving portion and the power supplying portion are changed, the light emitting portion changes the manner of light emission.

6. The light emitting interior product according to claim 1, wherein the first component is the movable body and is a register, which is located at a vent for conditioned air in an air conditioner and adjusts at least one of a flow direction and a flow rate of the conditioned air, the second component is the fixed body and is a bezel provided about the vent, the power supplying portion is provided in the bezel, the power receiving portion and the light emitting portion are provided in the register, and when the register is moved so that relative positions of the power receiving portion and the power supplying portion are changed, the light emitting portion changes the manner of light emission.

7. The light emitting interior product according to claim 1, wherein the power receiving portion further includes a power storing portion, which is connected in parallel with the light emitting portion.

8. The light emitting interior product according to claim 1, wherein the second component is the fixed body and is a third storage body having an opening, the first component is the movable body and is a lid, which selectively opens and closes the opening of the third storage body, the lid includes an optically transparent base member and an ornamental member attached to the base member, the power supplying portion is provided in the third storage body, the power receiving portion and the light emitting portion are provided in the lid, the light emitting portion emits light to the base member and the ornamental member at a first luminance when the opening is closed by the lid, and when the lid opens the opening so that one of the distance and the angle between the power receiving portion and the power supplying portion is changed, the light emitting portion changes the luminance to a second luminance, which is different from the first luminance.

9. The light emitting interior product according to claim 1, wherein the second component is the fixed body and is a fourth storage body having an opening, which is selectively opened and closed by a lid, the first component is the movable body and is a tray, which is stored in the fourth storage body to be retracted into and extracted from the fourth storage body, the power supplying portion is provided in the fourth storage body, the power receiving portion and the light emitting portion are provided in the tray, the light emitting portion emits light at a first luminance when the tray is stored in the fourth storage body, and when the tray is extracted from the opening so that the distance between the power receiving portion and the power supplying portion is changed, the light emitting portion changes the luminance to a second luminance, which is different from the first luminance.

10. The light emitting interior product according to claim 1, wherein the second component is the fixed body and is a case having a placement portion, on which a second object is placed, the second object is one of a plurality of types of second objects having different postures when placed on the placement portion, the first component is the movable body and is a movable holding member, which is extracted from and retracted into the placement portion of the case and holds the second object placed on the placement portion such that the second object has a posture suitable for the second object, the power supplying portion is provided in the case, the power receiving portion and the light emitting portion are provided in the movable holding member, the light emitting portion emits light at a first luminance when the movable holding member projects from the placement portion of the case, and when the movable holding member is retracted into the case so that one of the distance and the angle between the power receiving portion and the power supplying portion is changed, the light emitting portion changes the luminance to a second luminance, which is different from the first luminance.

11. The light emitting interior product according to claim 1, wherein the first component is the movable body and is a third object, the third object is one of a plurality of types of third objects each having a guided portion, the second component is the fixed body and is a console box having a storage portion, a top surface of which is opened to store the third object, a guide portion is provided in a wall surface of the storage portion, wherein the guide portion extends linearly and the guided portion of the third object is detachably engaged with the guide portion, the power supplying portion is provided in the console box, the power receiving portion and the light emitting portion are provided in the third object, and when the third object is slid relative to the console box in a direction in which the guide portion extends so that the distance between the power receiving portion and the power supplying portion is changed, the light emitting portion changes a luminance.

* * * * *